(12) United States Patent
Kwon et al.

(10) Patent No.: US 10,044,510 B2
(45) Date of Patent: Aug. 7, 2018

(54) STORING AND USING DATA WITH SECURE CIRCUITRY

(71) Applicant: Samsung Electronics Co., Ltd., Gyeonggi-do (KR)

(72) Inventors: Eun Young Kwon, Seoul (KR); Bum Han Kim, Seoul (KR); Jong Su Kim, Gyeonggi-do (KR); Michael Pak, Seoul (KR); Dae Haeng Cho, Gyeonggi-do (KR); Dong Ho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 183 days.

(21) Appl. No.: 15/046,097

(22) Filed: Feb. 17, 2016

(65) Prior Publication Data

US 2016/0239686 A1 Aug. 18, 2016

(30) Foreign Application Priority Data

Feb. 17, 2015 (KR) .................. 10-2015-0024536
Aug. 13, 2015 (KR) .................. 10-2015-0114957

(51) Int. Cl.
*H04L 9/08* (2006.01)
*H04L 9/32* (2006.01)
*G06F 21/60* (2013.01)
*G06F 21/72* (2013.01)

(52) U.S. Cl.
CPC .......... *H04L 9/3268* (2013.01); *G06F 21/602* (2013.01); *G06F 21/606* (2013.01); *G06F 21/72* (2013.01); *H04L 9/0897* (2013.01); *H04L 9/3231* (2013.01)

(58) Field of Classification Search
CPC ....... G06F 21/602; G06F 21/606; G06F 21/72
USPC ........................................ 713/193
See application file for complete search history.

(56) References Cited

U.S. PATENT DOCUMENTS

| 6,522,274 B1* | 2/2003 | Amar ................ G06F 3/05 341/139 |
| 2008/0215890 A1* | 9/2008 | Buer ................ H04L 9/3231 713/186 |
| 2014/0031024 A1 | 1/2014 | Xie et al. |

* cited by examiner

Primary Examiner — Eleni A Shiferaw
Assistant Examiner — Angela R Holmes
(74) Attorney, Agent, or Firm — The Farrell Law Firm, P.C.

(57) ABSTRACT

An electronic device is provided. The electronic device includes a processor, a memory configured to connect to the processor, and an embedded secure element (eSE) configured to connect to the processor over a physical channel to receive secure data sent by the processor over the physical channel, and store the secure data.

18 Claims, 27 Drawing Sheets

STORING AND USING DATA WITH SECURE CIRCUITRY

PRIORITY

This application claims priority under 35 U.S.C. § 119(a) to Korean Patent Application Serial number 10-2015-0024536, which was filed on Feb. 17, 2015 in the Korean Intellectual Property Office, and to Korean Patent Application Serial number 10-2015-0114957, which was filed on Aug. 13, 2015 in the Korean Intellectual Property Office, the entire disclosure of each of these applications is incorporated herein by reference.

BACKGROUND

1. Field of the Disclosure

The present disclosure relates generally to storing and using data with secure circuitry, and more particularly, to an electronic device that uses a method for storing data, over a physical channel, between a processor and secure circuitry of an electronic device.

2. Description of the Related Art

Electronic devices, such as smartphones or table computers, may include secure circuitry mounted therein (e.g., an embedded secure element (eSE)). The secure circuitry may be circuitry or a chip for storing information, such as personal information, which requires high security. The secure circuitry may be used when making a payment using wireless communication.

The secure circuitry may be provided in a removable form or an embedded form within the electronic device. The secure circuitry may be managed according to an authorized control command of a reliable external server, thereby protecting the secure circuitry from an external malicious attack. When managed by only a control command of the external server, the secure circuitry embedded in the electronic device may be restricted to an effective mutual operation with another circuit in the electronic device.

SUMMARY

Aspects of the present disclosure have been made to address at least the above-mentioned problems and/or disadvantages and to provide at least the advantages described below. Accordingly, an aspect of the present disclosure is to provide a method for storing data over a physical channel between a processor and secure circuitry of an electronic device, a method for using the stored data, and an electronic device for supporting the same.

In accordance with an aspect of the present disclosure, an electronic device is provided. The electronic device includes a processor, a memory configured to connect to the processor, and secure circuitry configured to connect to the processor over a physical channel receive data sent by the processor over the physical channel, and store the data.

In accordance with another aspect of the present disclosure, a data storing method performed in an electronic device is provided. The method includes obtaining data, which is requested to perform authentication, from a processor of the electronic device, over a physical channel, and storing at least part of the data in an eSE of the electronic device that is connected to the processor.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1A:
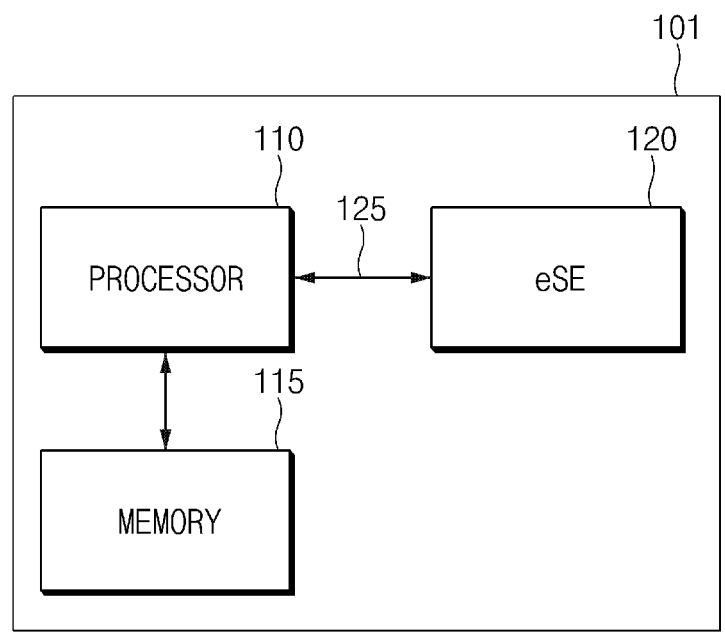
FIGS. 1A and 1B are diagrams illustrating a configuration of an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync', Apple TV', or Google TV™), game consoles (e.g., Xbox™ and PlayStation'), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

The secure circuitry disclosed herein may be a circuitry for storing secure data and securing a protected instruction execution environment. The secure circuitry may be present in a removable smart chip or a removable secure digital (SD) card or may be embedded in a fixed chip mounted on an electronic device. The secure circuitry may be circuitry which is mounted on a subscriber identification module (SIM) card or a finance related smart card. The secure circuitry may include a sub-circuit such as a cryptographic processor or a random number generator. The secure circuitry may operate according to a smart card operating system (OS) such as a JavaCard open platform (JCOP) OS. The secure circuitry may be an eSE in a fixed chip of the electronic device. The eSE disclosed herein may be an example of the secure circuitry. The present disclosure is not limited thereto.

FIG. 1A is a diagram illustrating a configuration of an electronic device, according to an embodiment of the present disclosure.

Referring to FIG. 1A, an electronic device 101 includes a processor 110, a memory 115, and an eSE 120. The processor 110 connects to the eSE 120 over a physical channel 125.

The processor 110 may include one or more of a central processing unit (CPU), an application processor (AP), or a communication processor (CP). The processor 110 may perform, for example, calculation or data processing about control and/or communication of at least another component of the electronic device 101.

The processor 110 may include a region for performing general calculation and a region for performing calculation associated with processing data (e.g., biometrics information, payment information, and the like) associated with security. Information about components of the processor 110 is provided with reference to FIG. 1B.

The memory 115 may include a volatile and/or nonvolatile memory. The memory 115 may store instructions or data processed by the processor 110. The memory 115 may store data which is different from those of the eSE 120. For example, the memory 115 may store encrypted fingerprint (FP) information, and the eSE 120 may store a secure key used to encrypt FP information.

The eSE 120 may be circuitry which stores secure data and secures a protected instruction execution environment. The eSE 120 may be implemented to be independent of the processor 110 and the memory 115 and may be embedded in a fixed chip. The eSE 120 may have security which is relatively stronger than the processor 110 and the memory 115 with respect to a physical attack and a hacking attack. The eSE 120 may store data (e.g., a secure key, and the like) requested to perform authentication when being accessed.

The physical channel 125 may send data between the processor 110 and the eSE 120. The physical channel 125 may establish a local path where the processor 110 may directly control the eSE 120 without being affected by an external network (e.g., a wireless internet). The processor 110 may directly send a control signal to the eSE 120 over the physical channel without passing through a separate near field communication (NFC) and the like. Also, the processor 110 may receive a result corresponding to the control signal from the eSE 120 over the physical channel 125. The physical channel 125 may be implemented with a serial peripheral interface (SPI), a recommended standard (RS) 232 interface, an inter-integrated circuit (I2C), and the like. For one example, if implemented with the SPI, the physical channel 125 may configured in the form of a serial bus including four lines which directly connect the processor 110 with the eSE 120. For another example, if implemented with the I2C, the physical channel 125 may be implemented with one line.

Figure 1B:
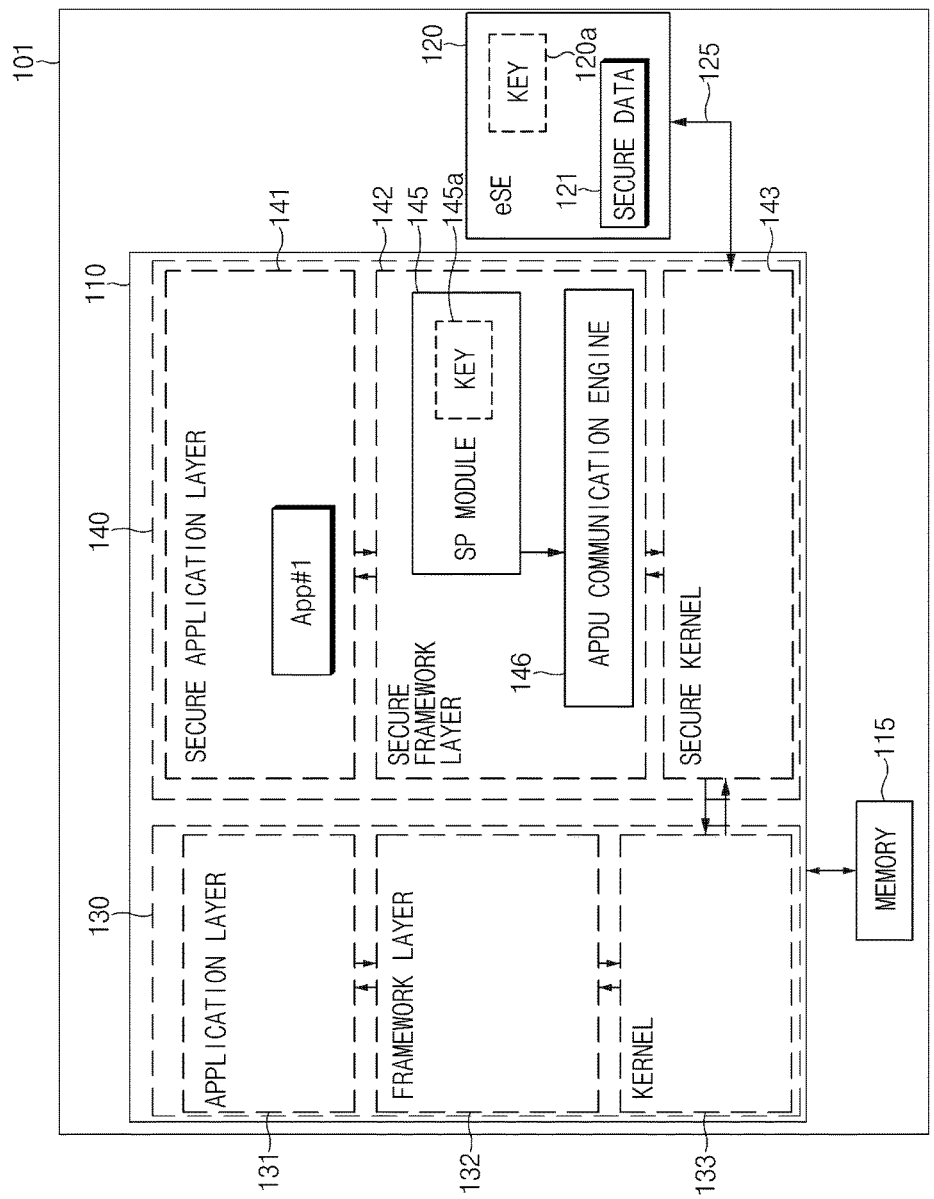

FIG. 1B is a diagram illustrating a configuration of an electronic device, according to an embodiment of the present disclosure.

Referring to FIG. 1B, the electronic device 101 includes a processor 110, a memory 115, and an eSE 120.

The processor 110 includes a general environment 130 (e.g., a rich execution environment (REE)) and a secure environment 140 (e.g., a trusted execution environment (TEE)). The processor 110 may process data, requested to have a relatively high secure level, through the secure environment 140. The general environment 130 and the secure environment 140 may be implemented with a physically divided form or a divided software form (or both). The secure environment 140 may connect to the eSE 120 over the physical channel 125.

The processor 110 may access the eSE 120 through the secure environment 140 and the physical channel 125, but not the general environment 130. The processor 110 may store information, requested to have a relatively high secure level, in the eSE 120 through the secure environment 140 and the physical channel 125.

The general environment 130 may perform general calculation work which is not related to a security task. The general environment 130 may include one or more of a CPU, an AP, or a CP. The general environment 130 may execute, for example, calculation or data processing about control and/or communication of at least another component (e.g., the memory 115, a communication interface, and the like) of the electronic device 101. The general environment may include an application layer 131, a framework layer 132, and a kernel 133.

The application layer 131 may include an operating system (OS) which controls resources associated with the electronic device 101 and a plurality of applications executed on the OS.

The framework layer 132 may process one or more work requests, received from the application layer 131, in order of priorities. The framework layer 132 may perform scheduling or load balancing and the like for the one or more work requests by processing the one or more work requests in order of the priorities. In various embodiments of the present disclosure, the framework layer 132 may include a library necessary for driving the secure environment 140.

The kernel 133 may control or manager system resources (e.g., a bus, the processor 110, or the memory 115) used to execute an operation or function implemented in other programs (e.g., the framework layer 132 or the application layer 131). The kernel 133 may include a driver for driving the secure environment 140.

The secure environment 140 may be a region (e.g., the TEE) for performing calculation associated with processing data (e.g., biometrics information, payment information, and the like) associated with security in the processor 110. The secure environment 140 may have a key (e.g., a secret key) shared with the eSE 120 and may directly communicate encrypted data with the eSE 120 using the key. The secure environment 140 may include a secure application layer 141, a secure application layer 142, and a secure kernel 143.

The secure application layer 141 may include an application which requests a secure level which is relatively higher than that of general data. For example, the secure application layer 141 may include a payment app (e.g., an online or offline app), a user authentication app (e.g., a biometrics app such as a fingerprint recognition app and an iris recognition app).

The secure framework layer 142 may process one or more work requests, received from the secure application layer 141, in order of priorities. The secure framework layer 142 may perform a function of encrypting data transmitted to the eSE 120. The secure framework layer 142 includes a secure protocol (SP) module 145 and an application protocol data unit (APDU) communication engine 146. The APDU communication module 146 may perform communication according to a message format defined in ISO 7816-4.

The SP module 145 may be a module which encrypts one or more work requests, received from the application layer 131, through a key 145a shared with the eSE 120. The key 145a may be shared through a provisioning process and like. The key 145a may be the same key as a key 120a stored in the eSE 120 or may be a key corresponding to the key 120a.

The provisioning process may be a process of sharing a key for establishing a session between the processor 110 and the eSE 120. The provisioning process may proceed through a key exchange request of the processor 110 and a key exchange response of the eSE 120.

The processor 110 may send a key exchange request to the eSE 120 through the secure environment 140. The key exchange request may include an algorithm identifier, a process identifier, a public key according to a predetermined secure algorithm, and the like.

The eSE 120 may verify a predetermined condition (e.g., information about whether a stored key is present, state information of the eSE 120, and the like) and may generate and store a first key. For example, the eSE 120 may calculate a key derivation function (KDF) according to a processor identifier, an eSE identifier, and the like, and may generate and store a key.

The eSE 120 may send a key exchange response to the processor 110. The key exchange response may include a success code if the processor 110 succeeds in generating and storing a key. The key exchange response may include an error code if the processor 110 fails in generating and storing a key. The eSE 120 may send a key (e.g., a public key), generated to perform key exchange, and a message authentication code (MAC) data as a response.

If receiving the success code, the processor 110 may calculate a KDF by using a processor identifier, an eSE identifier, and the like as factors, and may generate and store a second key.

The secure application layer 141 may encrypt some data through the SP module 145 and may provide the other data to the APDU communication engine 146 without passing through the SP module 145 and without a separate encryption process. The data encrypted through the SP module 145 may be determined according to the degree of secure necessity.

The APDU communication module 146 may be a module which converts a format of data into a format which may be recognized by the eSE 120.

The secure framework layer 142 may include a framework for separately managing data (e.g., biometrics information, such as FP information, and payment related information) requested to have a relatively high secure level. For example, the secure framework layer 142 may include a separate framework for converting FP information recognized through an FP sensor and encrypting or decrypting the FP information. Information about a method of using processing and using the FP information may be provided with reference to FIGS. 3-11.

The secure kernel 143 may control or manage system resources (e.g., a bus, the processor 110, or the memory 115, and the like) used to execute an operation or function implemented in other programs (e.g., the secure framework layer 142 or the secure application layer 141). The secure kernel 143 may include an eSE driver. The eSE driver may provide an interface for sending data between the secure environment 140 and the eSE 120.

The eSE 120 may store the key 120a shared with the secure environment 140. The key 120a may correspond to the key 145a stored in the SP module 145. The eSE 120 may share a key with the secure environment 140 through a provisioning process. The eSE 120 may establish a session with the secure environment 140 using the key 120a and may communicate important or secure data 121 (hereinafter referred to as "secure data 121"), requested to be stored in the eSE 120, through the session.

The eSE 120 may store the secure data 121. The secure data 121 may be data itself having a relatively high secure level or other information (e.g., a secure key used to encrypt the data) associated with the data. The electronic device 101 may store the secure data 121 in the eSE 120 without storing the secure data 121 in the secure environment 140 or in a memory managed by the secure environment 140 to protect important information from an external physical or hacking attack. The eSE 120 may establish a session with the secure environment 140 using the key 120a and may communicate the secure data 121 through the session.

Hereinafter, storing data in the general environment 130 may include storing the corresponding data in a memory area managed by the general environment 130. Also, storing data in the secure environment 140 may include storing the corresponding data in a memory area managed by the secure environment 140.

The processor 110 may store information, requested to have a relatively high secure level, in the eSE 120 without storing the information in the general environment 130 or the secure environment 140. Also, the processor 110 may determine whether to store data of various secure levels in one of the eSE 120, the secure environment 140, and the general environment 130 according to a predetermined standard. For example, the processor 110 may store FP information associated with an FP image in the secure environment 140 and may store a secure key (e.g., a random key), used to encrypt the FP information, in the eSE 120.

Figure 2A:
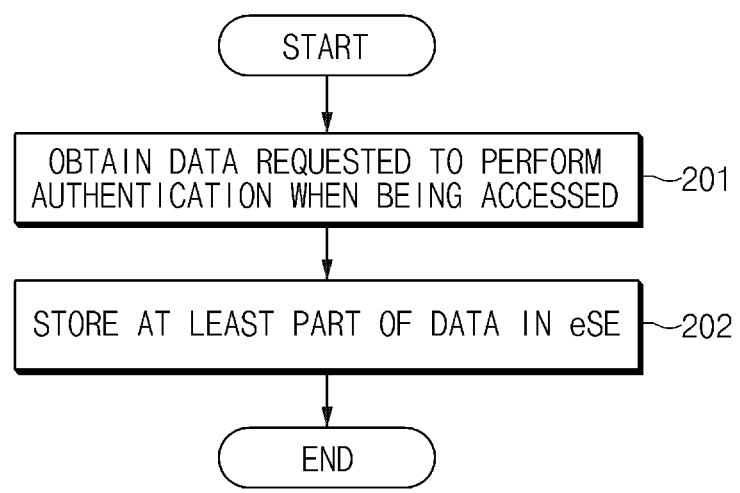
FIG. 2A is a flowchart illustrating a method of storing data in an eSE, according to an embodiment of the present disclosure.

FIG. 2A is a flowchart illustrating a method of storing data in an eSE, according to an embodiment of the present disclosure.

Referring to FIG. 2A, in step 201, the processor 110 obtains data requested to perform authentication when being accessed. The data may be data (e.g., biometrics information, such as FP information, and payment related information) requested to have a relatively high secure level. The data may be preset by a user or may be automatically preset by a setting of an application.

In step 202, the processor 110 stores at least part of the data in the eSE 120 over the physical channel 125. The processor 110 may directly control the eSE 120 through the secure environment 140 and the physical channel 125. The processor 110 stores all of the data or some data (e.g., a cryptographic key and the like) associated with the data in the eSE 120. The processor 110 stores important information (e.g., a secure key and the like) in the eSE 120 to protect the important information from an external physical or hacking attack.

Figure 2B:
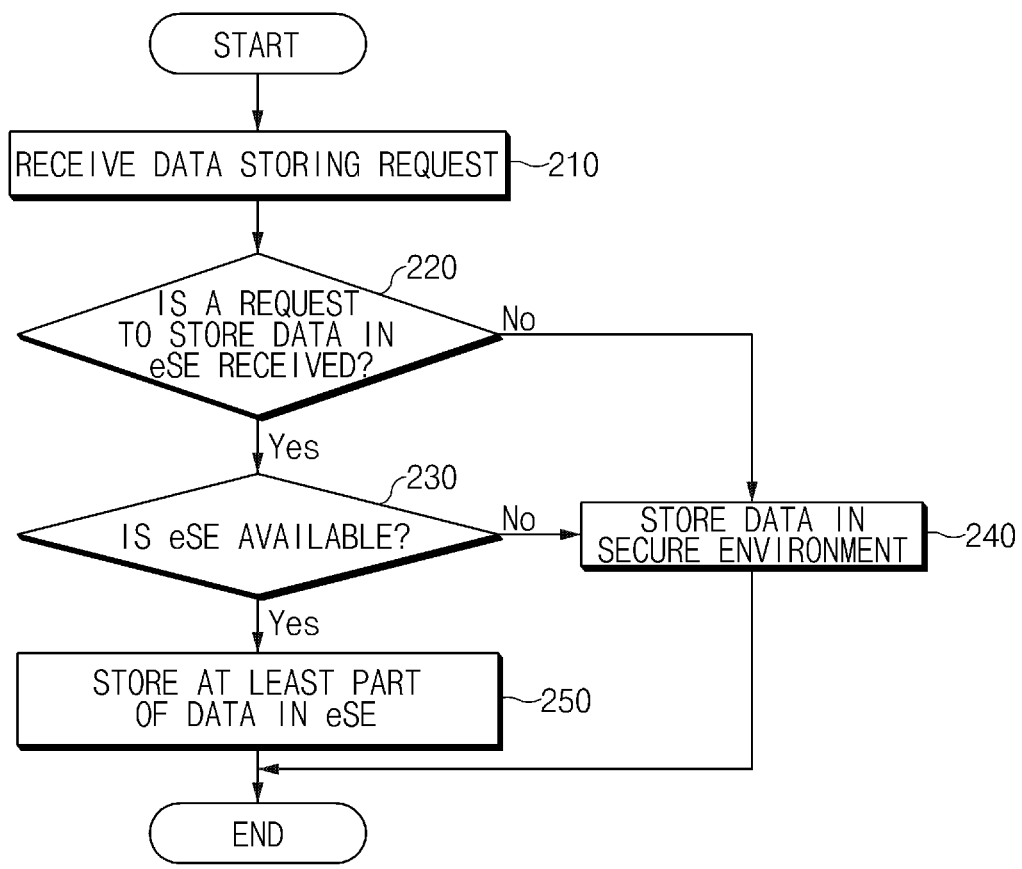
FIG. 2B is a flowchart illustrating a method of storing data in a secure environment or an eSE, according to an embodiment of the present disclosure.

FIG. 2B is a flowchart illustrating a method of storing data in a secure environment or an eSE, according to an embodiment of the present disclosure.

Referring to FIG. 2B, in step 210, the secure environment 140 receives a request to store predetermined data (e.g., biometrics information, such as FP information, and payment related information) from the general environment 130. The request may be generated by a user through an interface of an application, and may be set to be automatically generated if a predetermined application (e.g., a payment application) is executed.

In step 220, the secure environment 140 determines whether a request to store the data in an eSE 120 is received. The secure environment 140 may determine a region to store the data according to information included in the request. For example, if information indicating a secure level is a predetermined value or more, the secure environment 140 may be configured to store the data in the eSE 120. If the information indicating the secure level is less than the predetermined value, the secure environment 140 may be configured to store the data in a memory 115 of FIG. 1B managed by the secure environment 140.

The secure environment 140 determines a storing position according to a type of the data. For example, the secure environment 140 may verify a secure level included in each data. The secure environment 140 may store data (e.g., feature points of FP data, iris recognition data, and the like) having a relatively low secure level in the general environment 130 or the memory 115 which may accessed by the secure environment 140. The secure environment 140 may store data (e.g., ridges of FP data, a key used to encrypt FP data, a key used to encrypt iris data, and the like) having a relatively high secure level in the eSE 120.

In step 230, if receiving a request to store the data in the eSE 120, the secure environment 140 verifies that an available eSE 120 is present.

In step 240, if not receiving the request to store the data in the eSE 120, the secure environment 140 stores the data therein. If there is no eSE 120 or if the eSE 120 is unavailable (e.g., if there is no key shared through a provisioning process or if there is a need for resetting the eSE 120, and the like), the secure environment 140 stores the data therein.

For example, if there is a reset request of an external server (e.g., a trusted service manager (TSM) server) and if a shared key is damaged or deleted due to damage of a memory area or the eSE 120, the secure environment 140 may proceed with a reset procedure of the eSE 120. In this case, the secure environment 140 may not store the data in the eSE 120 and may temporarily store the data in the secure environment 140. After a reset procedure is completed, if a key is shared through a provisioning process, the secure environment 140 may move the data to the eSE 120 to store the data in the eSE 120.

In step 250, if there is the available eSE 120, the secure environment 140 stores the data in the eSE 120. The secure environment 140 may have the key 145*a* shared with the eSE 120 through the provisioning process. The secure environment 140 may establish a session with the eSE 120 and may communicate data through the session.

Hereinafter, the data is assumed to be FP related data. However, the present disclosure may not be limited thereto. For example, the data may be various types of data such as payment information (e.g., a credit card number and a password), user recognition information (e.g., biometrics information, such as FP recognition information and iris recognition information, and health information), or information (e.g., privacy information such as a secret document, a diary, a photo, and an image) a user wants to protect.

Figure 3:
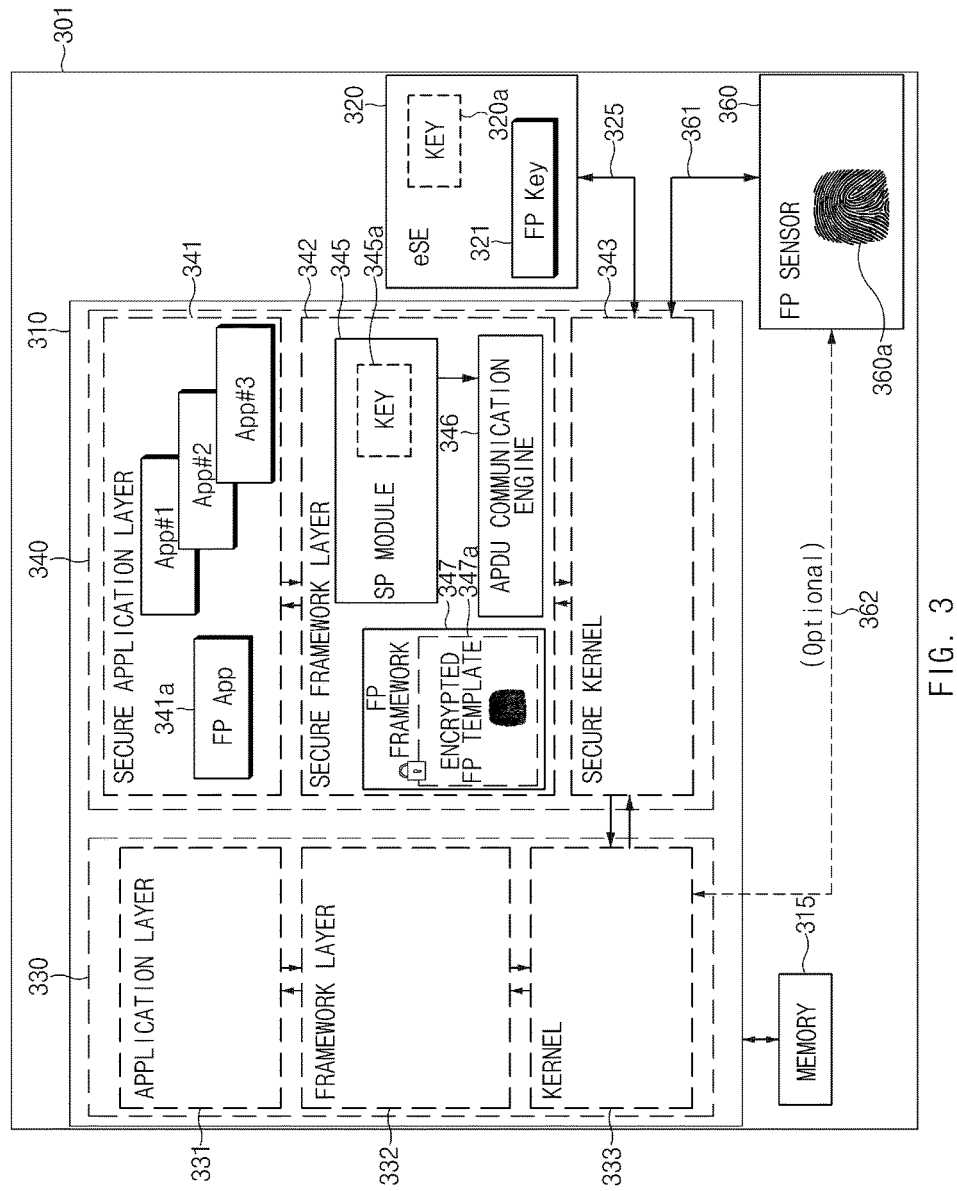
FIG. 3 is a diagram illustrating a configuration of an electronic device connected with a fingerprint (FP) sensor through a secure environment, according to an embodiment of the present disclosure.

FIG. 3 is a diagram illustrating a configuration of an electronic device connected with a fingerprint (FP) sensor through a secure environment, according to an embodiment of the present disclosure.

Referring to FIG. 3, an electronic device 301 includes a processor 310, an eSE 320, and an FP sensor 360. The processor 310 includes a general environment 330 and a secure environment 340.

The secure environment 340 may connect with the eSE 320 over a physical channel 325. Also, the secure environment 340 may connect with the FP sensor 360 over a channel 361. The secure environment 340 may include a secure application layer 341, a secure framework layer 342, and a secure kernel 343.

The secure application layer 341 may execute an application which processes information of a relatively high secure level. The secure application layer 341 may execute an app associated with biometrics (e.g., FP recognition, iris recognition, and the like) or an app associated with online/offline payment, and the like. The secure application layer 341 may execute an FP application 341*a* using FP information recognized by the FP sensor 360. The FP application 341*a* may be a payment app, a diary app, or a biometric information app, and the like, which request user authentication.

The secure framework layer 342 may process one or more work requests, received from the secure application layer 341, in order of priorities. The secure framework layer 342 may include an SP module 345, an application protocol data unit (APDU) communication engine 346, and an FP framework 347.

The FP framework 347 may store and process FP information recognized by the FP sensor 360. The FP framework 347 may generate an FP template according to FP information (e.g., an FP image 360*a*) received from the FP sensor 360. The FP template may be information in which FP image information obtained through the FP sensor 360 is encoded. The FP template may be data converted by encoding a feature included in an FP image, not the FP image itself.

Also, the FP framework 347 may encrypt the generated FP template using a predetermined secure key 321 (e.g., a random key). Thereafter, the secure key 321 may be stored in the eSE 320 and may be deleted from the secure environment 340. An encrypted FP template 347*a* may be managed by the secure environment 140, and the secure key 321 may be separately stored in the eSE 320 to strengthen security of FP information.

If an FP registration request is received, the FP framework 347 may generate a random key and may encrypt an FP template using the generated random key. Also, if a previously stored secure key is present in the secure environment 340 or the eSE 320, the FP framework 347 may encrypt an FP template using the stored secure key.

Figure 4:
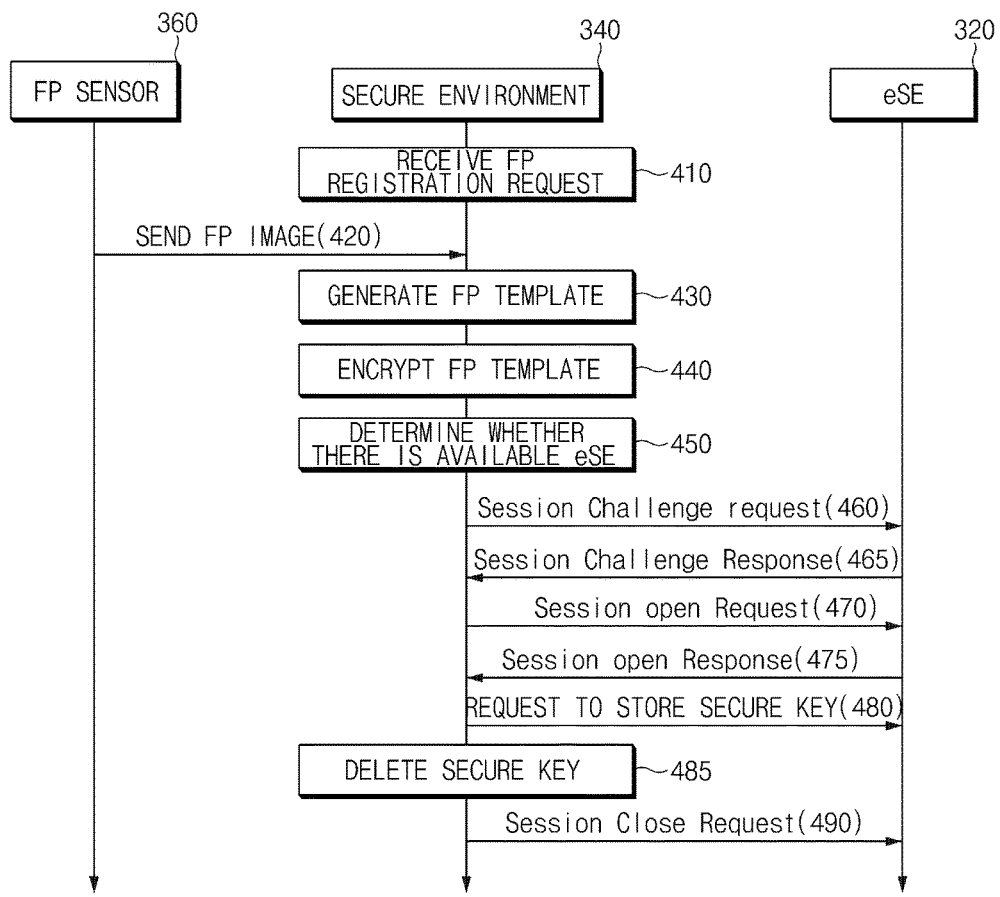
FIG. 4 is a signal sequence diagram illustrating an FP registration process, according to an embodiment of the present disclosure.

Information relating to an operation of encrypting FP information and storing the encrypted FP information in the eSE 320 is provided with reference to FIG. 4. Information relating to an operation of performing an authentication procedure using information stored in the eSE 320 is provided with reference to FIG. 5.

The FP sensor 360 may recognize an FP of a user. The FP sensor 360 may convert an FP of the user into a digital image. The FP sensor 360 may connect with the secure environment 340 over the channel 361 which may communicate FP related information with the secure environment 340.

The FP sensor 360 may provide the sensed FP image 360*a* to the secure environment 340 over the channel 361. The FP image 360*a* provided to the secure environment 340 may be used in a user authentication or payment process and the like. The FP sensor 360 may recognize an FP to perform initial registration or may recognize an FP to perform the user authentication process after the FP is registered. The FP sensor 360 may operate by being controlled by the FP application 341*a* (e.g., a diary app or a payment app, and the like).

The FP sensor 360 may connect to the general environment 330 over an optional channel 362 independent of the channel 361 connected to the secure environment 340. The channel 362 may be used if the FP image 360*a* is not provided over the channel 361 (e.g., there is a channel error, if there is an increase in data traffic, and the like). The FP image 360*a* sent over the channel 361 may be provided to the secure environment 340 through the general environment 330.

FIG. 4 is a signal sequence diagram illustrating an FP registration process, according to an embodiment of the present disclosure.

Referring to FIG. 4, in step 410, the secure environment 340 receives an FP registration request. For example, if a user selects an FP registration option in the FP application 341*a*, the FP registration request is generated if he or she resets registered FP information.

In step 420, the secure environment 340 may receive the FP image 360*a* from an FP sensor 360. The FP image 360*a* may be provided over the channel 361 between the secure environment 340 and the FP sensor 360. As it may be difficult to use the channel 361 (e.g., if there is a channel error, if there is an increase in data traffic, and the like), the FP image 360*a* may be sent over the channel 362 which connects the general environment 330 with the FP sensor 360. In this case, the general environment 330 may provide the FP image 360*a* to the secure environment 340.

In step 430, the secure environment 340 generates an FP template according to the received FP image 360*a*. The FP template may be information in which FP image information obtained through the FP sensor 360 is encoded.

In step 440, the secure environment 340 encrypts the generated FP template using the predetermined secure key 321 (e.g., a random key). If there is a previously stored secure key, the secure environment 340 may encrypt the FP template using the stored secure key.

In step 450, the secure environment 340 determines if there is an available eSE 320. If there is no eSE 320, or if the eSE 320 is unavailable (e.g., if there is no key shared through a provisioning process, if there is a need for resetting the eSE 320, and the like), the secure environment 340 may determine a region to store FP information. For one example, the secure environment 340 may determine to store the secure key 321 in the secure environment 340 and to store the encrypted FP template 347*a* 3 in the general environment 330. Alternatively, the secure environment 340 may determine to store therein both of the encrypted FP template 347*a* and the secure key 321.

If the available eSE 320 is available, in steps 460-490, the secure environment 340 opens a session and stores the secure key 321 in the eSE 320.

In steps 460-465, the secure environment 340 sends a session challenge request to the eSE 320. The eSE 320 may send a session challenge response corresponding to the session challenge request to the secure environment 340.

In step 470, the secure environment 340 sends a session open request to the eSE 320. The secure environment 340 may generate a first session open vector and may send the session open request including message authentication code (MAC) data of the session challenge response to the eSE 320.

In step 475, the eSE 320 sends a session open response corresponding to the session open request to the secure environment 340. The eSE 320 may generate a second session open vector and may send the session open response including MAC data for the generated second session open vector to the secure environment 340.

In step 480, the secure environment 340 requests the eSE 320 to store a secure key (e.g., a random key) used to encrypt an FP template.

In step 485, if it is determined that the secure key 321 is stored in the eSE 320, the secure environment 340 may delete the secure key stored therein. The secure environment 340 may store the secure key 321 in only the eSE 320 which has a relative high secure level to strengthen security of FP information.

In step 490, the secure environment 340 sends a session close request to the eSE 320. The secure environment 340 may open a separate session to use stored information and may request the eSE 320 to send the stored information.

Figure 5A:
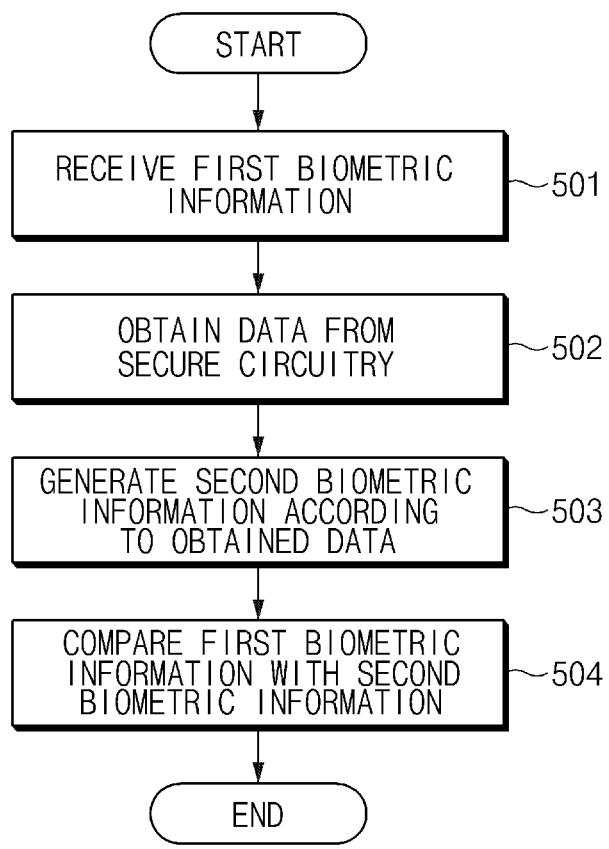
FIG. 5A is a flowchart illustrating a method for an authentication process using stored biometric information, according to an embodiment of the present disclosure.

FIG. 5A is a flowchart illustrating a method for an authentication process using stored biometric information, according to an embodiment of the present disclosure.

In step 501, the processor 310 receives first biometric information (e.g., the FP image 360*a*) from a biometric information sensing module (e.g., the FP sensor 360) which is connected to the processor 310. The biometric information sensing module may collect user recognition information (e.g. FP recognition information, iris recognition information, and the like) and may provide the collected information to the processor 310.

In step 502, the processor 310 obtains data corresponding to the first biometric information from the eSE 320 connected over the physical channel 325. For example, the data may be a secure key used to encrypt information which is the same as or similar to the first biometric information. The processor 310 may establish a session with the eSE 320 through the secure environment 340 and may request the eSE 320 to send the data.

In step 503, the processor 310 generates second biometric information according to at least part of the data. For example, if the data is a secure key used to encrypt biometric information, the processor 310 may decrypt previously stored biometric information using the secure key.

In step 504, the processor 310 performs authentication according to a result of comparing the first biometric information with the second biometric information. If the first biometric information is identical to the second biometric information, the processor 310 may determine that the first biometric information is valid and may provide the result through a related application. In contrast, if the first biometric information is different from the second biometric information, the processor 310 may cancel an authentication process using the first biometric information or may output an authentication error message. Hereinafter, biometric information is assumed to be FP information. The present disclosure is not limited thereto.

Figure 5B:
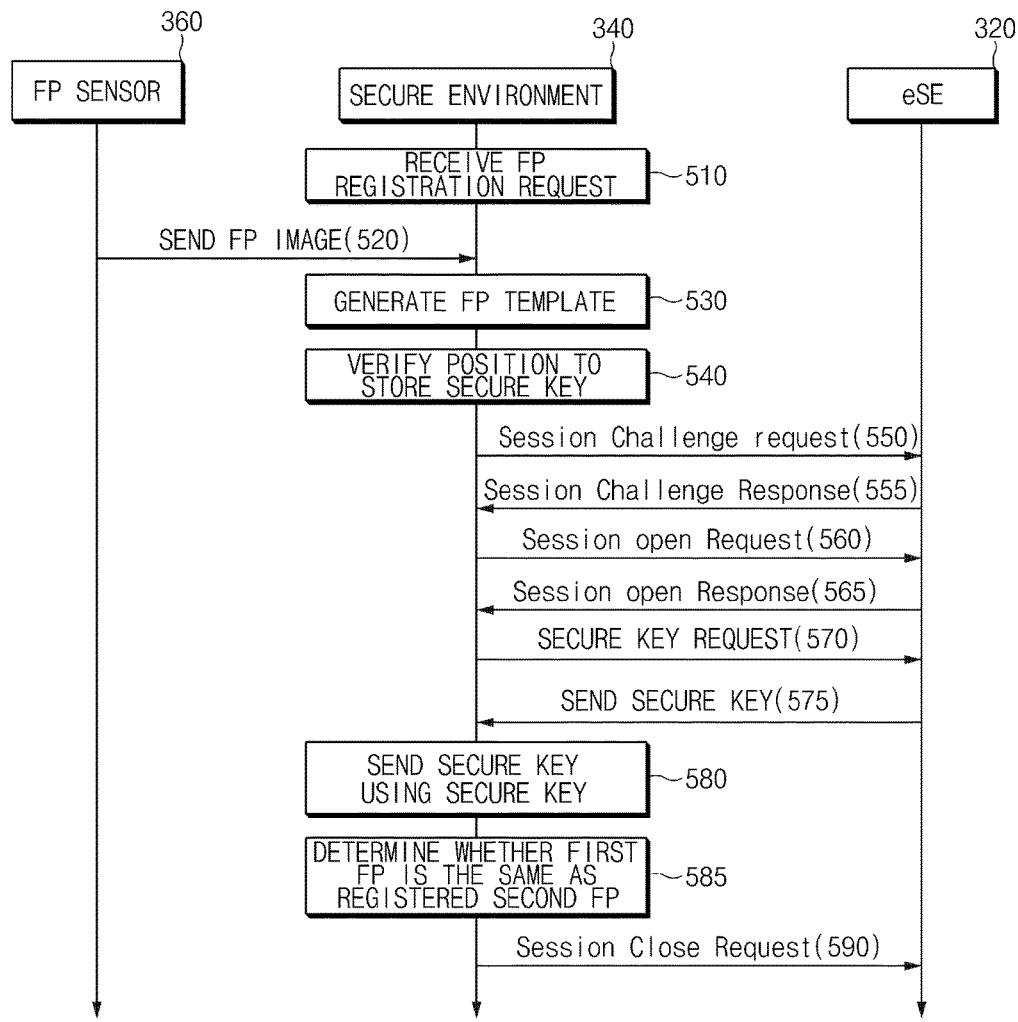
FIG. 5B is a signal sequence diagram illustrating a method for an authentication process using stored FP information, according to an embodiment of the present disclosure.

FIG. 5B is a signal sequence diagram illustrating a method for an authentication process using stored FP information, according to an embodiment of the present disclosure.

Referring to FIG. 5B, in step 510, the secure environment 340 receives an FP authentication request. For example, the FP authentication request may be set to be automatically generated, if a user selects an FP authentication request in the FP application 341a or if a predetermined application (e.g., a payment application) is executed.

In step 520, the secure environment 340 receives an FP image from the FP sensor 360. The FP image ("a first FP") may be used to determine whether a user is an authorized user through comparison of the first FP with a stored FP image ("a second FP").

In step 530, the secure environment 340 generates an FP template according to FP image of the first FP.

In step 540, the secure environment 340 verifies a position to store a secure key for decrypting an FP template for the encrypted and stored second FP. If the secure key 321 is stored in an eSE 320, the secure environment 340 may open a session and request the eSE 320 to send the secure key 321.

Session challenge and open processes of steps 550-565 may be the same as session challenge and open processes of steps 460-475 in FIG. 4, and, therefore, a detailed description of steps 550-565 is omitted.

In steps 570-575, if the session is opened, the secure environment 340 sends a request to send the secure key 321 to the eSE 320. The eSE 320 may send the stored secure key 321 to the secure environment 340 in response to the request.

In step 580, the secure environment 340 decrypts an FP template for the second FP using the received secure key 321.

In step 585, the secure environment 340 compares the first FP recognized through the FP sensor 360 with the decrypted second FP to determine if the first FP is identical to the registered second FP.

In step 590, if the FP comparison process is ended, the secure environment 340 sends a session close request to the eSE 320.

Figure 6:
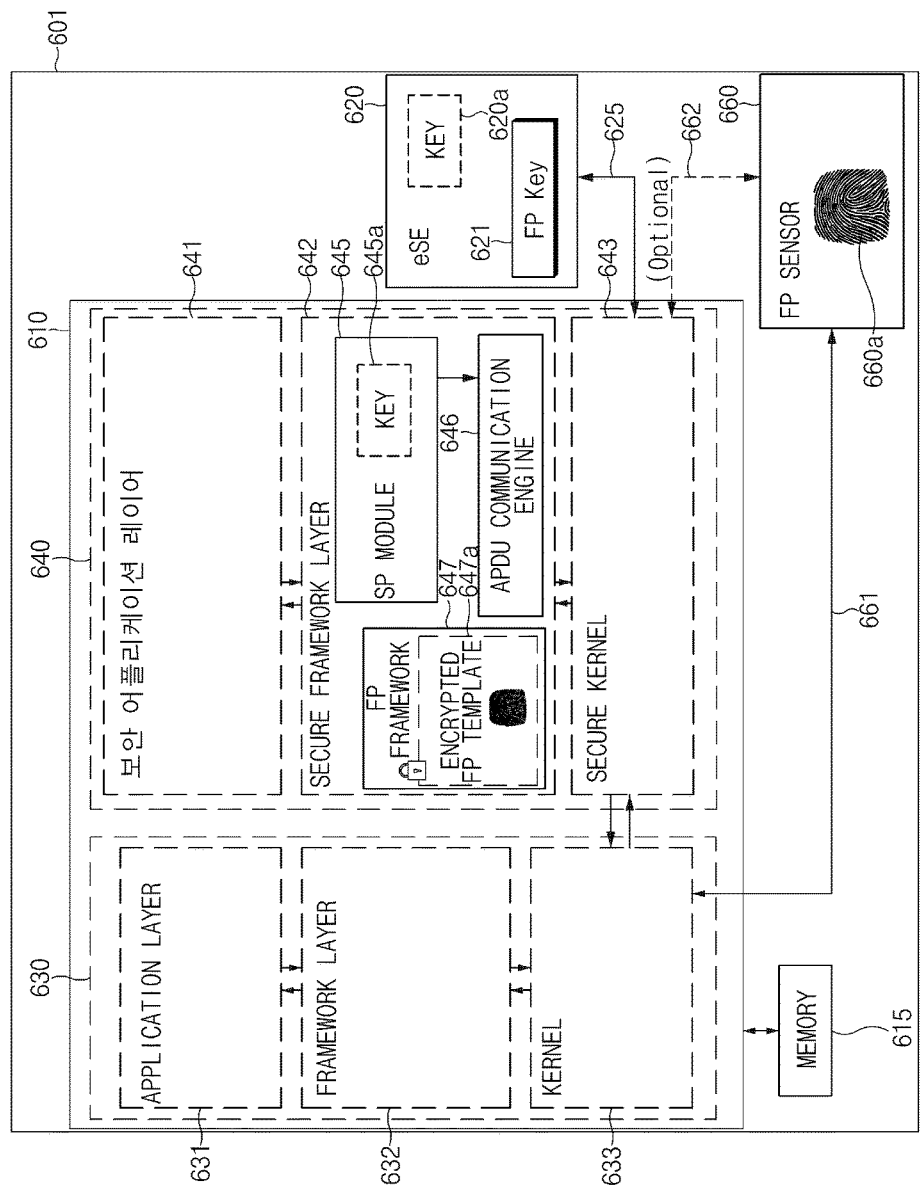
FIG. 6 is a diagram illustrating a configuration of an electronic device connected with an FP sensor through a general environment, according to an embodiment of the present disclosure.

FIG. 6 is a diagram illustrating a configuration of an electronic device connected with an FP sensor through a general environment, according to an embodiment of the present disclosure.

Referring to FIG. 6, an electronic device 601 includes a processor 610, a memory 615, an eSE 620, and an FP sensor 660. The processor 610 includes a general environment 630 and a secure environment 640. The secure environment 640 may connect with the eSE 620 over a physical channel 625.

Compared with the electronic device 301 of FIG. 3, the electronic device 601 may primarily connect to the general environment 630 over a channel 661. An optional channel 662 over which the FP sensor 660 connects to the secure environment 640 may be used.

If the FP sensor 660 connects to the general environment 630 over the channel 661, information about an FP image 660a may be provided to the secure environment 640 through the general environment 630. In this case, since a possibility that the secure environment 640 will directly connect with the outside is reduced, security of the secure environment 640 may be strengthened. Also, applications which operate in the general environment 630 may easily use information recognized through the FP sensor 660.

Figure 7:
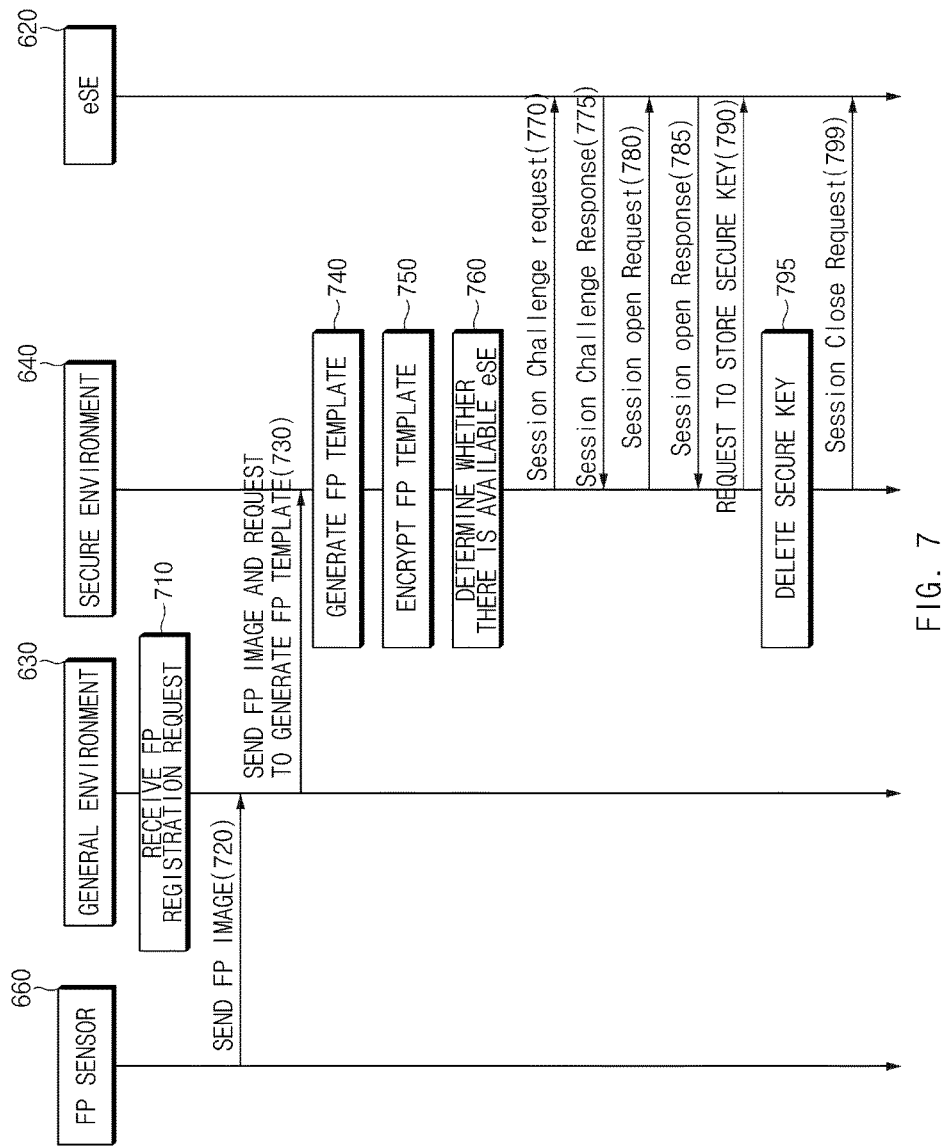
FIG. 7 is a signal sequence diagram illustrating a method for an FP registration process through a general environment, according to an embodiment of the present disclosure.

Information relating to a process of registering an FP through the general environment 630 is provided with reference to FIG. 7.

FIG. 7 is a signal sequence diagram illustrating a method for an FP registration process through a general environment, according to an embodiment of the present disclosure.

Referring to FIG. 7, in step 710, the general environment 630 receives an FP registration request from an FP related application. For example, if the user selects an FP registration option in an FP related application (e.g., an application, such as a payment app and a diary app, which may use FP information), the FP registration request may be generated if registered FP information is reset.

In step 720, the general environment 630 receives the FP image 660a from the FP sensor 660. The FP image 660a may be provided over the channel 661 between the general environment 630 and the FP sensor 660. As it may be difficult to use the channel 661 (e.g., if there is a channel error, if there is an increase in data traffic, and the like), the FP image 660a may be sent over the channel 662 which connects a secure environment 640 with the FP sensor 660.

In step 730, the general environment 630 sends the FP image 660a to the secure environment 640 to request the secure environment 640 to generate an FP template according to the FP image 660a.

Steps 740-799 may be the same as operations 430-490 in FIG. 4, and, therefore, a detailed description of steps 740-799 is omitted.

The secure key 621 stored through operations 710-799 may be used in a way similar to the process of FIG. 5B. In this case, if receiving an FP authentication request, the general environment 630 may receive an FP image (e.g., a first FP) from the FP sensor 660. The general environment 630 may provide the received FP image to the secure environment 640 to request the secure environment 640 to generate an FP template for the first FP. The secure environment 640 may compare the first FP with a stored second FP decrypted through the secure key 621 stored in an eSE 620 to proceed with an FP authentication process.

Figure 8:
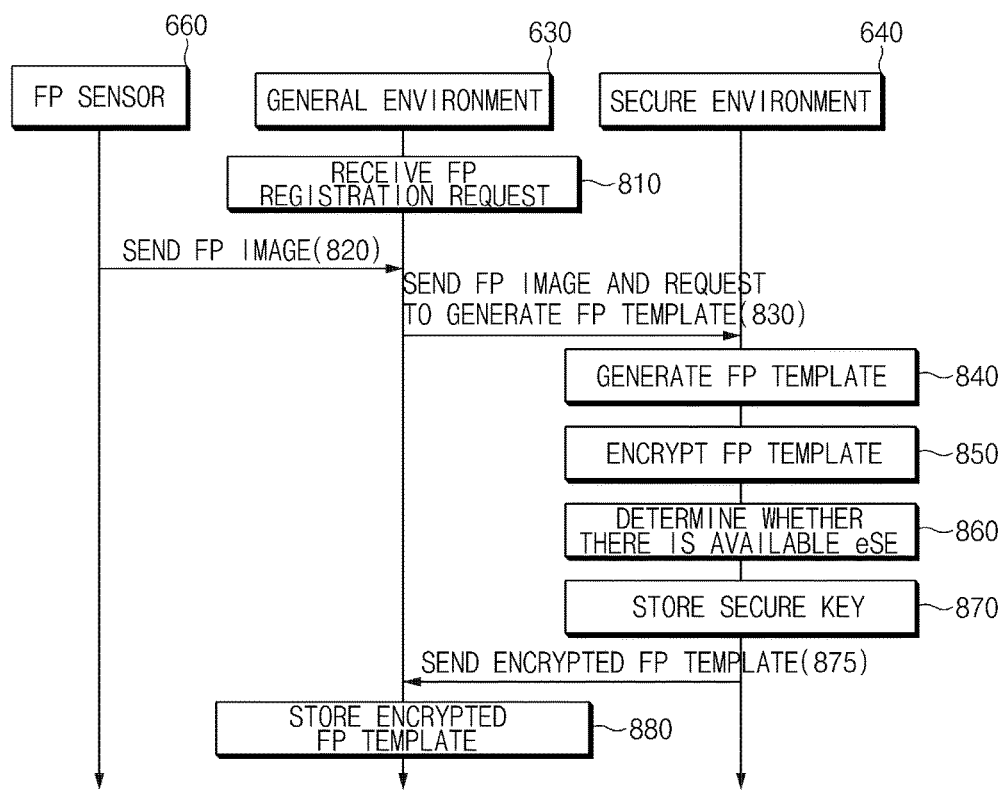
FIG. 8 is a signal sequence diagram illustrating a method for an FP registration process if an eSE is unavailable, according to an embodiment of the present disclosure.

FIG. 8 is a signal sequence diagram illustrating a method for an FP registration process if an eSE is unavailable, according to an embodiment of the present disclosure.

Steps 810-850 are the same as operations 710-750 in FIG. 7, and, therefore, a detailed description of steps 810-850 is omitted.

In step 860, the secure environment 640 determines whether there is an available eSE 620. IF there is no eSE 620 or if the eSE 620 is unavailable (e.g., if there is no key shared through a provisioning process, if there is a need for resetting the eSE 620, and the like), the secure environment 640 may divide and store FP information in a general environment 630 or therein.

In steps 870-875, the secure environment 640 stores the secure key 621 therein and sends information about an encrypted template except for the secure key 621 in the general environment 630.

In step 880, the general environment 630 y stores the received encrypted FP template.

The above-mentioned method divides and stores the FP information in the general environment 630 or the secure environment 640 to enhance a secure level. However, compared with a method of storing the secure key 621 in the eSE 620, the above-mentioned method may have a low secure level. The secure environment 640 may periodically determine whether the eSE 620 is available. If the eSE 620 is changed to an available state, the secure environment 640 may change a position to store the FP information. Information relating to the storing of the FP information according to a state change of the eSE 620 is provided with reference to FIG. 9.

In FIG. 8, for example, regions where the secure key 621 and the encrypted FP template 647a are stored may be changed in a setting way. For example, both of the secure key 621 and the encrypted FP template 647a may be stored in the secure environment 640.

Figure 9:
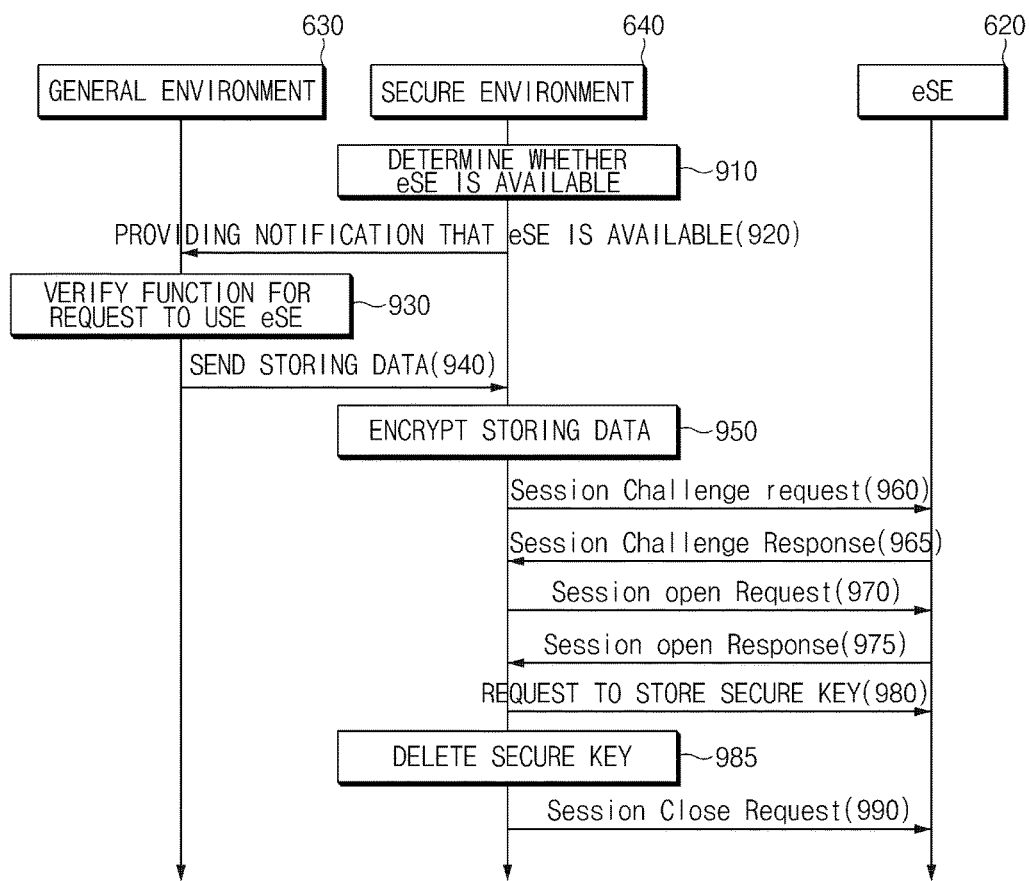
FIG. 9 is a signal sequence diagram illustrating a method for a process of storing FP information according to a change of a use state of an eSE, according to an embodiment of the present disclosure.

FIG. 9 is a signal sequence diagram illustrating a method for a process of storing FP information according to a change of a use state of an eSE, according to an embodiment of the present disclosure.

Referring to FIG. 9, in step 910, the secure environment 640 determines whether an eSE 620 is changed from an unavailable state to an available state. For example, after a provisioning process of the eSE 620 is completed, if the eSE 620 is changed to a state where a key for opening a session is shared, the secure environment 640 may determine that the eSE 620 is changed to the available state.

In step 920, the secure environment 640 informs the general environment 630 that the eSE 620 is changed to the available state.

In step 930, the general environment 630 verifies a function for a request to use the eSE 620. For example, the general environment 630 may verify that each of an FP app, a payment app, a diary app, and the like requests the eSE 620 to store information.

In step 940, the general environment 630 sends storing data to be stored in the eSE 620 to the secure environment 640.

In step 950, the secure environment 640 encrypts the storing data through a secure key. For example, the secure environment 640 may receive an FP image from the general environment 630, may generate an FP template, and may encrypt the generated FP template using a random key.

In steps 960-990, the secure environment 640 stores the secure key, used to encrypt the storing data, in the eSE 620 and deletes the secure key from the secure environment 640 to strengthen security. Steps 960-990 are the same as steps 460-490 of FIG. 4, and, therefore, a detailed description of steps 960-990 is omitted.

Figure 10:
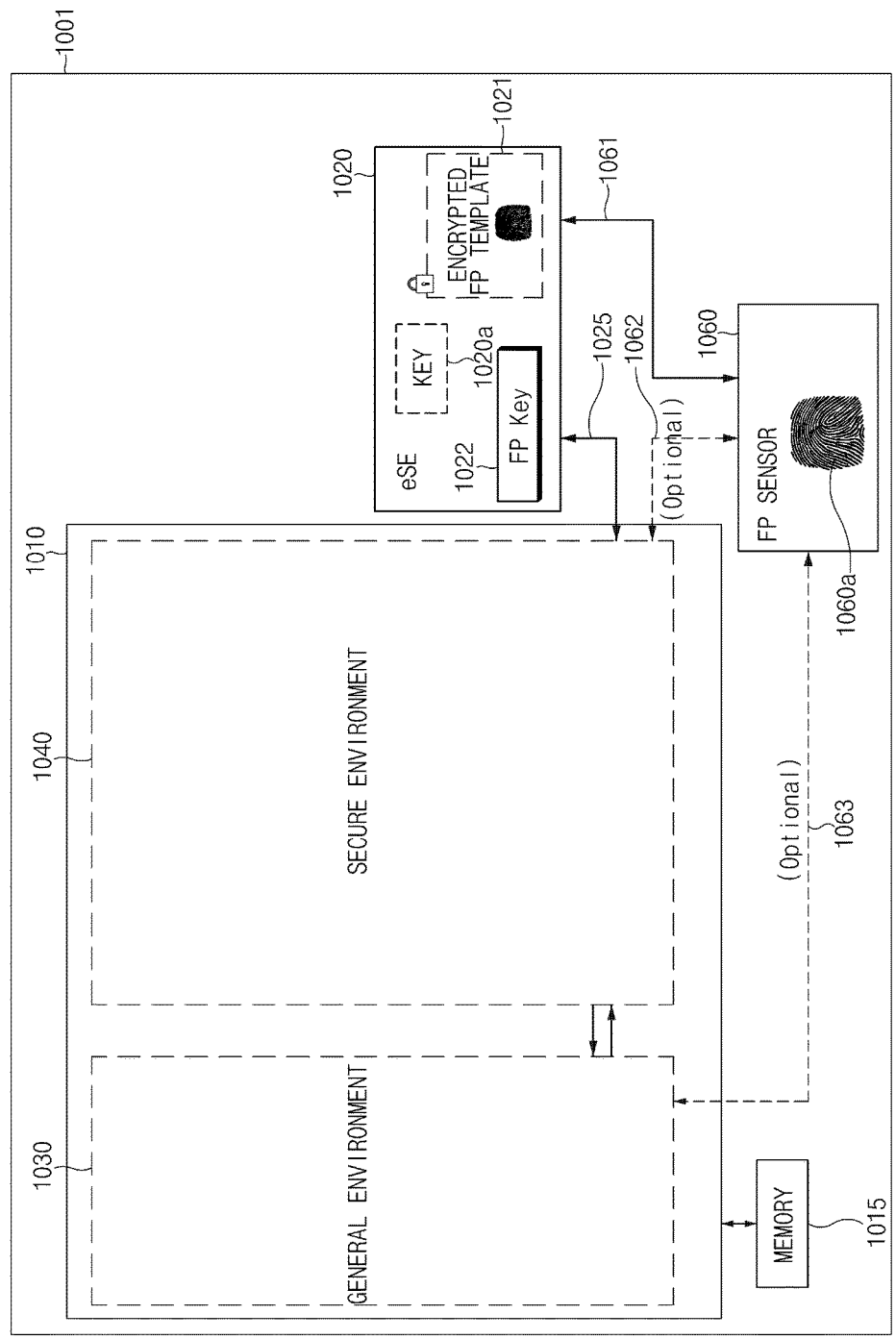
FIG. 10 is a diagram illustrating a configuration of an electronic device in which a sensing channel is established between an FP sensor and eSE, according to an embodiment of the present disclosure.

FIG. 10 is a diagram illustrating a configuration of an electronic device in which a sensing channel is established between an FP sensor and eSE, according to an embodiment of the present disclosure.

Referring to FIG. 10, an electronic device 1001 includes a processor 1010, a memory 1015, an eSE 1020, and an FP sensor 1060. The processor 1010 includes a general environment 1030 and a secure environment 1040. The secure environment 1040 may connect with the eSE 1020 over a physical channel 1025.

Compared with the FP sensor 360 of FIG. 3 or the FP sensor 660 of FIG. 6, the electronic device 1001 may connect to the eSE 1020 over a sensing channel 1061. An optional channel 1062 over which the FP sensor 1060 connects to the secure environment 1040 or a channel 1063 over which the FP sensor 1060 connects to the general environment 1030 may be used.

If the FP sensor 1060 connects to the eSE 1020 over the sensing channel 1061, information about an FP image 1060a may be directly provided to the eSE 1020 without passing through the general environment 1030 or the secure environment 1040. In this case, all of information recognized through the FP sensor 1060 may be processed in the eSE 1020 through passing through the processor 1010 to strengthen security for FP information.

The eSE 1020 may receive the FP image 1060a from the FP sensor 1060 in response to an FP registration request or an FP authentication request from the secure environment 1020. The eSE 1020 may generate and encrypt an FP template from the FP image 1060a and may store an encrypted FP template 1021 and a secure key 1022. Information about generating and encrypting the FP template through the eSE 1020 may be provided with reference to FIG. 11.

The electronic device may include a processor, a memory configured to functionally connect with the processor, and secure circuitry configured to be independent of the processor and the memory and to connect with the processor over a physical channel. The processor may send at least part of data to the secure circuitry over the physical channel. The secure circuitry may store the at least part of the data. The data may include at least some of biometric information, payment information, health information, or privacy information, which corresponds to the electronic device.

The processor may be configured to encrypt the data and to store the encrypted data and a secure key, used to encrypt the data, in the secure circuitry. If the secure key is stored in the secure circuitry, the processor may delete the secure key stored in the processor. The physical channel may include an SPI.

The processor may operate to be independent of a general environment and a secure environment. The secure environment may be configured to store the at least part of the data in the secure circuitry over the physical channel or to import data stored data from the secure circuitry. The secure environment may establish a session according to a key shared with the secure circuitry, and may store the at least part of the data in the secure circuitry or may import stored data from the secure circuitry through the session. If there is no key shared with the secure circuitry, the secure environment may store the data in the secure environment and may share a key with the secure circuitry through a provisioning process.

The electronic device may further include a biometric sensing module configured to collect biometric information of a user. The processor may be configured to generate the at least part of the data using the biometric information. The biometric sensing module may have a channel connected with at least one of the general environment, the secure environment, or the secure circuitry.

The secure environment may encrypt biometric information, recognized through the biometric sensing module, using a secure key. The secure environment may store the encrypted biometric information in at least one of the general environment or the secure environment. The secure environment may store the secure key in one of the secure environment and the secure circuit. If the secure key is stored in the secure circuitry, the secure environment may delete the secure key stored in the secure environment.

The secure environment may verify whether the secure circuitry is available and may determine a position to store the biometric information or a secure key, used to encrypt the biometric information, according to a predetermined condition. If the secure circuitry is unavailable, the secure environment may send encrypted biometric information to the general environment and may store the secure key in the secure environment.

The general environment may send a request to authenticate biometric information to the secure environment and may send first biometric information, recognized through the biometric sensing module, to the secure environment. If receiving the request to authenticate the biometric information, the secure environment may establish a session according to a key shared with the secure circuitry, may request the secure circuitry to send the secure key stored in the secure circuit through the session, and may decrypt previously stored and encrypted second biometric information.

The secure circuitry may connect with the biometric sensing module over a sensing channel independent of the physical channel, may receive the biometric information over the sensing channel, and may encrypt the biometric information using a secure key. The secure circuitry may send a result of comparing first biometric information recognized through the biometric sensing module with second biometric information decrypted through the secure key to the secure environment according to a request of the secure environment.

The electronic device may include a memory and a processor. The processor may obtain data requested to perform authentication when being accessed and may control an eSE connected with the processor over a physical channel to store at least part of the data. The memory may store at least one instruction associated with operating the processor. The processor may determine whether the eSE is available. If the eSE is available, the processor may store the at least part of the data in the eSE.

The processor may establish a session according to a key shared between a secure environment of the processor and the eSE and may send the at least part of the data to the eSE through the session. The processor may determine whether the at least part of the data is stored in the eSE and may delete the at least part of the data from the secure environment.

The electronic device may include a memory and a processor. The processor may receive first biometric information from a biometric information sensing module functionally connected with the processor and may obtain data, for generating second biometric information corresponding to the first biometric information, from an eSE connected with the processor over a physical channel. The processor may generate the second biometric information according to at least part of the data and may perform authentication according to a result of comparing the first biometric information with the second biometric information. The memory may store at least one instruction associated with operating the processor.

Figure 11:
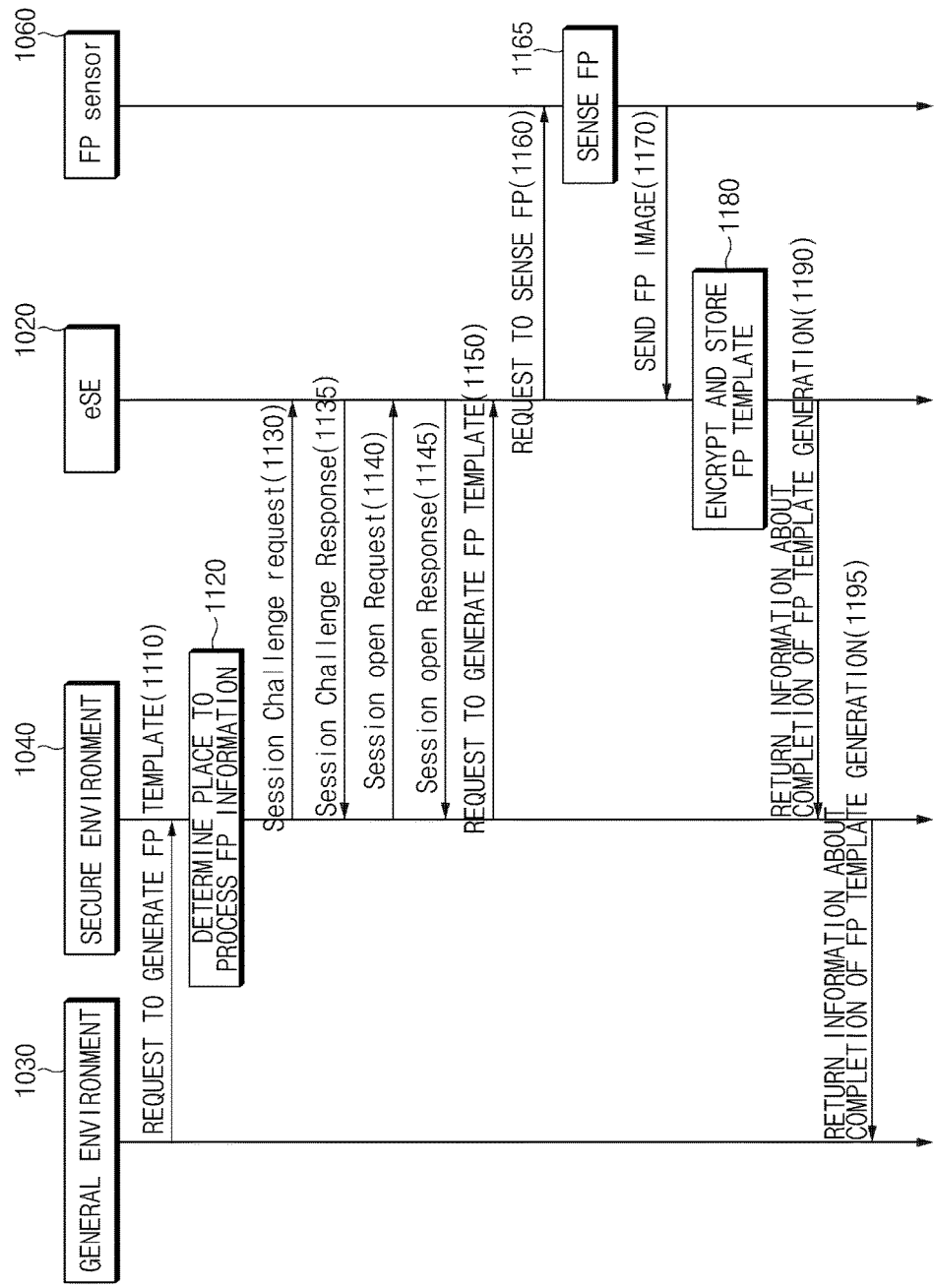
FIG. 11 is a signal sequence diagram illustrating a method for an FP registration process through a direct connection between an eSE and an FP sensor, according to an embodiment of the present disclosure.

FIG. 11 is a signal sequence diagram illustrating a method for an FP registration process through a direct connection between an eSE and an FP sensor, according to an embodiment of the present disclosure.

Referring to FIG. 11, in step 1110, the general environment 1030 sends a request to generate an FP template to a secure environment 1040.

In step 1120, the secure environment 1040 determines a place to process FP information according to the request. As shown in FIG. 10, if the FP sensor 1060 connects with an eSE 1020, the general environment 1030, or the secure environment 1040 over a channel 1061, 1062, or 1063, the secure environment 1040 may determine a place to process FP data according to a predetermined condition (e.g., a secure level of data, information about whether the eSE 1020 supports an interface, a storing space of the eSE 1020, and the like). Hereinafter, it is assumed that all of FP data are processed through the eSE 1020.

In steps 1130-1145, the secure environment 1040 opens a session and prepares for sending data to the eSE 1020. Steps 1130-1145 may be the same as steps 460-475 in FIG. 4, and, therefore, a detailed description of steps 1130-1145 is omitted.

In step 1150, the secure environment 1040 requests the eSE 1020 to generate an FP template.

In step 1160, the eSE 1020 requests the FP sensor 1060 to sense an FP. The eSE 1020 may directly control the FP sensor 1060 over the sensing channel 1061.

In step 1165, the FP sensor 1060 senses the FP and collects the FP image 1060a.

In step 1170, the FP sensor 1060 directly provides the collected FP image 1060a to the eSE 1020 over the sensing channel 1061.

In step 1180, the eSE 1020 generates an FP template according to the FP image 1060a and encrypts the generated FP template using the secure key 1022 (e.g., a random key). In this case, the secure key 1022 may be generated by the eSE 1020 and may not be sent to the processor 1010 to strengthen security.

In steps 1190-1195, if the generating of the FP template is completed, the eSE 1020 may return information about the completion of the FP template generation to the secure environment 104. The secure environment 1040 may return information about the completion of the FP template generation to the general environment 1030.

The above-mentioned process of all of information recognized through the FP sensor 1060 in the eSE 1020, without passing through the processor 1010, may strengthen security for FP information.

If an authentication process is performed using the FP template stored in the eSE 1020, the eSE 1020 may directly receive an FP image (e.g., a first FP) from the FP sensor 1060 over the sensing channel 1061. If receiving an FP authentication request through the secure environment 1040, the eSE 1020 may receive an FP image for the first FP from the FP sensor 1060 and may compare the received FP image with a stored second FP. After comparing the received FP image with the stored second FP, the eSE 1020 may provide a result of whether the first FP is identical to the second FP to the secure environment 1040.

Figure 12:
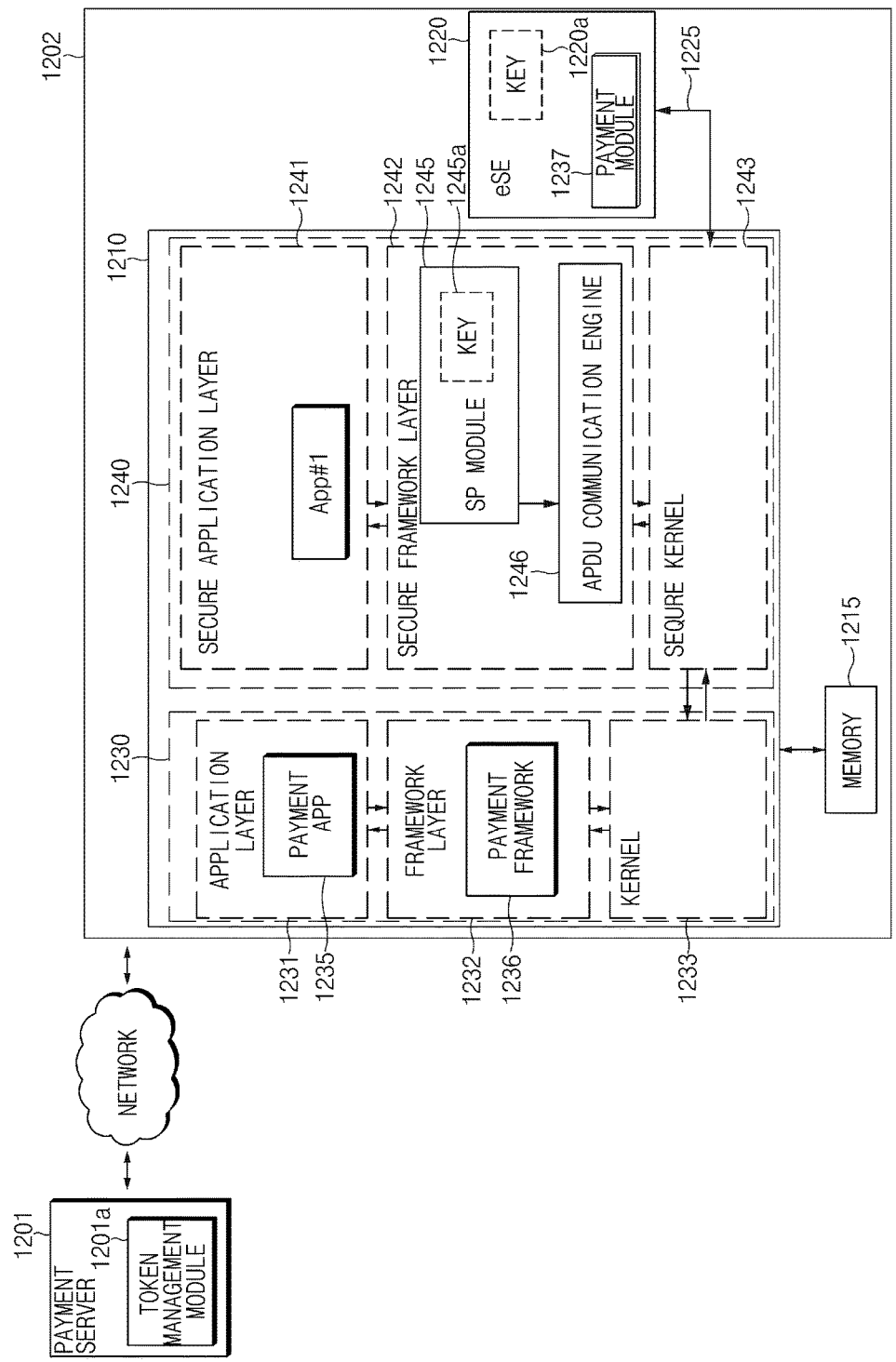
FIG. 12 is a diagram illustrating a payment method through an electronic device and a payment server, according to an embodiment of the present disclosure.

FIG. 12 is a diagram illustrating a payment method through an electronic device and a payment server, according to an embodiment of the present disclosure.

Referring to FIG. 12, a payment server 1201 communicates payment related information with an electronic device 1202 over a network. The payment server 1201 may exchange the payment related information with a payment app 1235 and may store or manage credit card information. The payment server 1201 may manage an account of a user and may manage payment information.

The payment server 1201 (e.g., the payment server 1201 may be one server or a network in which a plurality of servers are combined) may issue a token and may include a managed token management module 1201a. The token may be information used in payment rather than real credit card information (e.g., a credit card number, credit card user information, and the like). For example, the token may be an encrypted number which replaces a primary account number (PAN). The payment server 1201 may proceed with payment by a credit card using the token without communicating the PAN or user information over the network. The token may be temporarily used by a specific affiliated store, a specific channel, or a specific device.

The token management module 1201a (e.g., the token management module 1201a may be a module in one server or a server which performs token related function among a plurality of servers) may issue and manage a token according to a credit card registration request of a payment user. The issued token may be stored in an eSE 1220 of the electronic device 1202.

The electronic device 1202 may proceed with payment through network communication with the payment server 1201. The electronic device 1202 may perform payment with the payment server 1201 through the payment app 1235 and a payment framework 1236 included in a general environment 1230 and a payment module 1237 (e.g., a trusted app or a banking applet, and the like) installed in the eSE 1220.

The payment app 1235 may be executed on an application layer 1231. The payment app 1235 may provide a payment related user interface (UI) to the user. The payment app 125 may communicate data with the payment server 1201 according to a payment related request of the user. For example, if an account generation request, a log-in request, and the like are received from the user, the payment app 1235 may call an API for communicating with the payment server 1201 from the payment framework 1236 and may perform a function according to the request.

The payment app 1235 may provide a UI for performing a work such as account management (e.g., account generation, account deletion, and the like) and payment credit card management (e.g., payment credit card registration, payment credit card deletion, payment credit card update, and the like) and may receive a payment related request of the user. The payment app 1235 may manage a unique identifier (e.g., a user identification (ID) and a terminal ID), credit card information, membership information, and the like of the user, which are communicated with the payment server 1201.

The payment framework 1236 may be included in the framework layer 1232. The payment framework 1236 may include an API such that the payment app 1235 operates together with the payment server 1201 and an API necessary for performing a payment operation. The payment framework 1236 may perform an API called by the payment app 1235 and may perform a relay function between the payment app 1235 and the payment module 1237 stored in the eSE 1220. When a credit card registration request of the user is received, the payment framework 1236 may request the payment server 1201 to issue a token and may store the token issued from the payment server 1201 in the payment module 1237 stored in the eSE 1220. The secure environment 1240 may determine whether the eSE 1220 is available. If the eSE 1220 is available, the secure environment 1240 may store the token in the eSE 1220. In contrast, if the eSE 1220 is unavailable, the secure environment 1240 may store the token in a memory managed by the secure environment 1240.

The payment module 1237 (e.g., a banking applet and the like) may be an application installed by a bank, a credit card company (e.g., Visa, Master, and the like). If the user accepts installation of the payment module 1237 through the payment app 1235, the payment server 1201 may proceed with installing the payment module 1237.

For example, the payment framework 1236 may receive the credit card registration request of the user from the payment app 1235 and may obtain a credit card number, an expiration date, and the like of user's credit card through an optical character reader (OCR). The payment framework 1236 may request the payment server 1201 to register a credit card for installing the payment module 1237. The payment server 1201 may connect with an installation server of a bank/card company through connection information stored in the payment app 1235 or the payment framework 1236. The payment server 1201 may send an installation file to the electronic device 1202 to install the payment module 127 in the eSE 1220.

The payment module 1237 may be an application used to send data to the payment server 1201. The payment module 1237 may include information about a credit card, a debit card, a membership card, and the like. The payment module 1237 may store information associated with card information. For example, the information associated with the credit card may be at least one of a token corresponding to the credit card information (e.g., a PAN), a token reference ID, part of the PAN, a product ID of the PAN, a token request ID, a token confirmation level, token configuration data, a token expiration date, a cryptographic key, or a value (e.g., a one time password) provided from a token service provider. The token may be controlled by the payment server 1201 (e.g., a token service provider server). The payment module 1237 may store the credit card related information itself or may store a key used to encrypt the card related information.

A data storing method performed in an electronic device may include obtaining data requested to perform authentication when being accessed and storing part of the data in an embedded secure element (eSE) connected with a processor over a physical channel.

The storing of the at least part of the data in the eSE may include determining whether the eSE is available and storing the at least part of the data in the eSE if the eSE is available.

The storing of the at least part of the data in the eSE may include establishing a session according to a key shared between a secure environment of the processor and the eSE and sending the at least part of the data through the session.

The storing of the at least part of the data in the eSE may further include determining whether the at least part of the data is stored in the eSE and deleting the at least part of the data from the secure environment.

An authentication method performed in an electronic device may include receiving, by a processor, first biometric information from a biometric information sensing module functionally connected with the processor, obtaining, by the processor, data corresponding to the first biometric information from an eSE connected with the processor over a physical channel, generating, by the processor, second biometric information according to at least part of the data, and performing, by the processor, authentication according to a result of comparing the first biometric information with the second biometric information.

Figure 13:
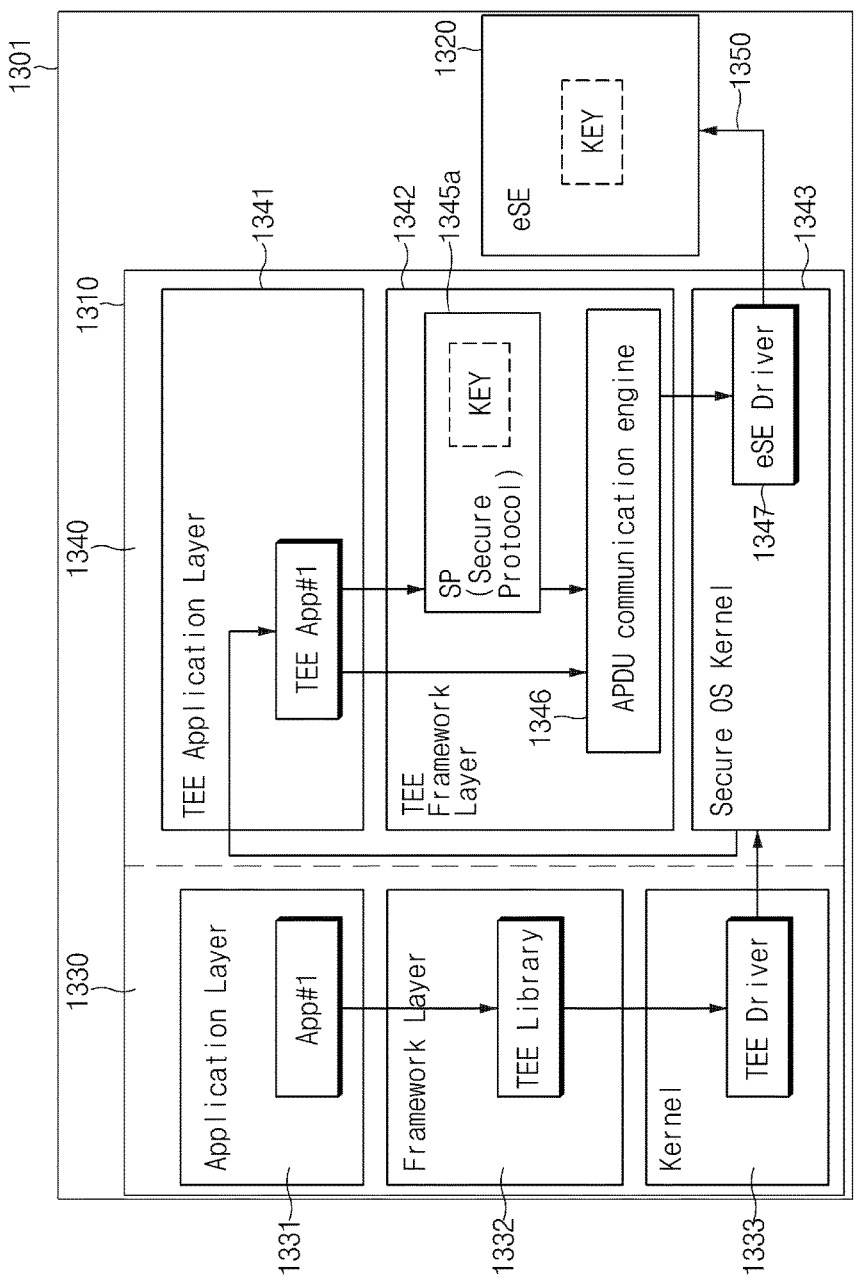
FIG. 13 is a diagram illustrating a configuration of an electronic device, according to an embodiment of the present disclosure.

FIG. 13 is a diagram illustrating a configuration of an electronic device, according to an embodiment of the present disclosure.

Referring to FIG. 13, an electronic device 1301 includes a processor 1310 and an eSE 1320. The electronic device 1301 further includes a physical channel 1350 for connecting the processor 1310 with the eSE 1320. The processor 1310 may establish a local path, which may access the eSE 1320 over the physical channel 1350, therein. If accessing the eSE 1320, the processor 1310 may encrypt data not through a general environment 1330, but a secure environment 1340 to enhance security.

The processor 1310 includes a general environment 1330 (e.g., a rich execution environment (REE)) and a secure environment 1340 (e.g., a TEE).

The general environment 1330 may perform a general calculation work which has low relation with a security task. The general environment 1330 may include one or more of a CPU, an AP, or a CP. The general environment 1330 may execute, for example, calculation or data processing about control and/or communication of at least another component (e.g., a memory, a communication interface, and the like) of the electronic device 1301. The general environment 1330 includes an application layer 1331, a framework layer 1332, and a kernel 1333.

The application layer 1331 may include an operating system (OS) which controls resources associated with an electronic device (e.g., the electronic device 1301) and a plurality of applications executed on the OS.

The framework layer 1332 may process one or more work requests, received from the application layer 1331, in order of priorities. The framework layer 1332 may perform scheduling or load balancing, and the like for the one or more work requests by processing the one or more work requests in order of the priorities. The framework layer 1332 may include a library necessary for driving the secure environment 1340.

The kernel 1333 may control or manage, for example, system resources (e.g., a bus, a processor, or a memory) used to execute an operation or function implemented in other programs (e.g., the framework layer 1332 or the application layer 1331). The kernel 1333 may include a driver for driving the secure environment 1340.

The secure environment 1340 may be a TEE independent of the general environment 1330 in the processor 1320. The secure environment 1340 may establish a local path therein for connecting the general environment 1330 with the eSE 1320. Data necessary for a secure process such as a cryptographic process among data of the general environment 1330 may be encrypted through the secure environment 1340 and may be sent to the eSE 1320. The secure environment 1340 may have a key (e.g., a secret key) shared with the eSE 1320 and may directly communicate encrypted data with the eSE 1320 using the key. The secure environment 1340 includes a TEE application layer 1341, a TEE framework layer 1342, and a secure OS kernel 1343.

The TEE application layer 1341 may include an application which requests a secure level which is relatively higher than that of general data. For example, the TEE application layer 1341 may include an offline payment app, a user authentication app (e.g., a biometrics app such as a fingerprint recognition app and an iris recognition app).

The TEE framework layer 1342 may process one or more work requests, received from the TEE application layer 1341, in order of priorities. The TEE framework layer 1342 may perform a function of encrypting data transmitted to the eSE 1320. The TEE framework layer 1342 may include an SP module 1345*a* and an application protocol data unit (APDU) communication engine 1346. The APDU communication module 1346 may perform communication according to a message format defined in ISO 7816-4.

The SP module 1345*a* may be a module which encrypts one or more work requests, received from the TEE application layer 1341, through a key shared with the eSE 1320. The key may be shared through a provisioning process and like. Some data provided from the TEE application layer 1341 may be encrypted through the SP module 1345*a* and the other data may be provided to the APDU communication engine 1346 without passing through the SP module 1345 and without a separate encryption process. The data encrypted through the SP module 1345 may be determined according to the degree of secure necessity.

The APDU communication module 1346 may be a module which converts a format of data into a format which may be recognized by the eSE 1320.

The secure OS kernel 1343 may control or manage, for example, system resources (e.g., the bus, the processor, or the memory, and the like) used to execute an operation or function implemented in other programs (e.g., the TEE framework layer 1342 or the TEE application layer 1341). The secure OS kernel 1343 may include an eSE driver 1347. The eSE driver 1347 may provide an interface for connecting to the eSE 1320.

The physical channel 1350 may send data between the secure environment 1340 in the processor 1310 and the eSE 1320. The physical channel 1350 may establish a local path where the processor 1310 may directly control the eSE 1320 without being affected by an external network (e.g., a wireless internet). The processor 1310 may directly communicate a control signal over the physical channel 1350 without passing through a separate near field communication (NFC) module and the like. Also, the processor 1310 may receive a result corresponding to the control signal from the eSE 1320. The physical channel 1350 may be implemented with a physical wire. The physical channel 1350 may be implemented with a SPI, a recommended standard (RS) 232 interface, an inter-integrated circuit (I2C), and the like.

Figure 14:
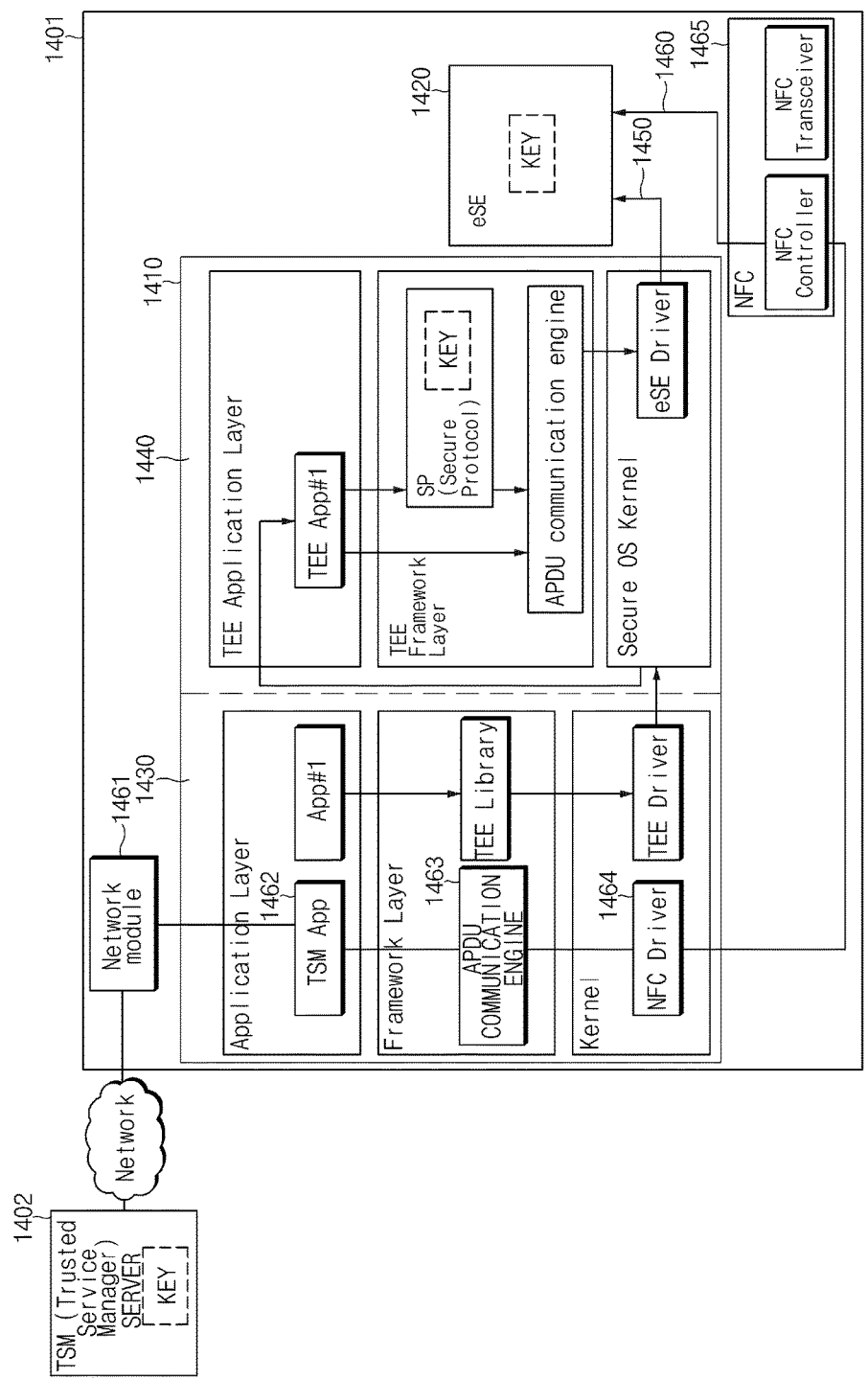
FIG. 14 is a diagram illustrating a configuration of an electronic device including a general network path and a local path, according to an embodiment of the present disclosure.

FIG. 14 is a diagram illustrating a configuration of an electronic device including a general network path and a local path, according to an embodiment of the present disclosure.

Referring to FIG. 14, an electronic device 1401 includes a processor 1410 and an eSE 1420. The electronic device 1401 further includes a physical channel 1450 for connecting the processor 1410 with the eSE 1420. The electronic device 1401 includes a local path (e.g., a path including a secure environment 1440 and the physical channel 1450) of the electronic device 1301 and a general network path 1460 through a near field communication (NFC) module 1465, which are paths for accessing the eSE 1420.

The processor 1410 includes a general environment 1430 and the secure environment 1440. The general environment 1430 may establish the general network path 1460. The general network path 1460 may be a path for sending a signal through a network module 1461, the general environment 1430 (e.g., a TSM application 1460, an APDU communication engine 1463, and an NFC driver 1464), and the NFC module 1465 from a TSM server 1402.

For example, the TSM server 1402 may provide a key to an eSE manufacturer in a step of assembling the electronic device 1401 to insert the key into the eSE 1420. The TSM server 1402 may have a key corresponding to a key stored in the eSE 1420. In case of a symmetric key scheme, the key of the eSE 1420 is the same as the key of the TSM server 1402. In case of an asymmetric key scheme, each of the eSE 1420 and the TSM server 1402 may have a public key and a private key.

If sending a control instruction to the eSE 1420, the TSM server 1402 may encrypt the control instruction using a key corresponding to the key of the eSE 1420 and may send the encrypted data to the eSE 1420. The eSE 1420 may decrypt the encrypted control instruction using the key stored in the eSE 1420. If succeeding in decrypting the control instruction, the eSE 1420 may perform the decrypted control instruction.

Figure 15A:
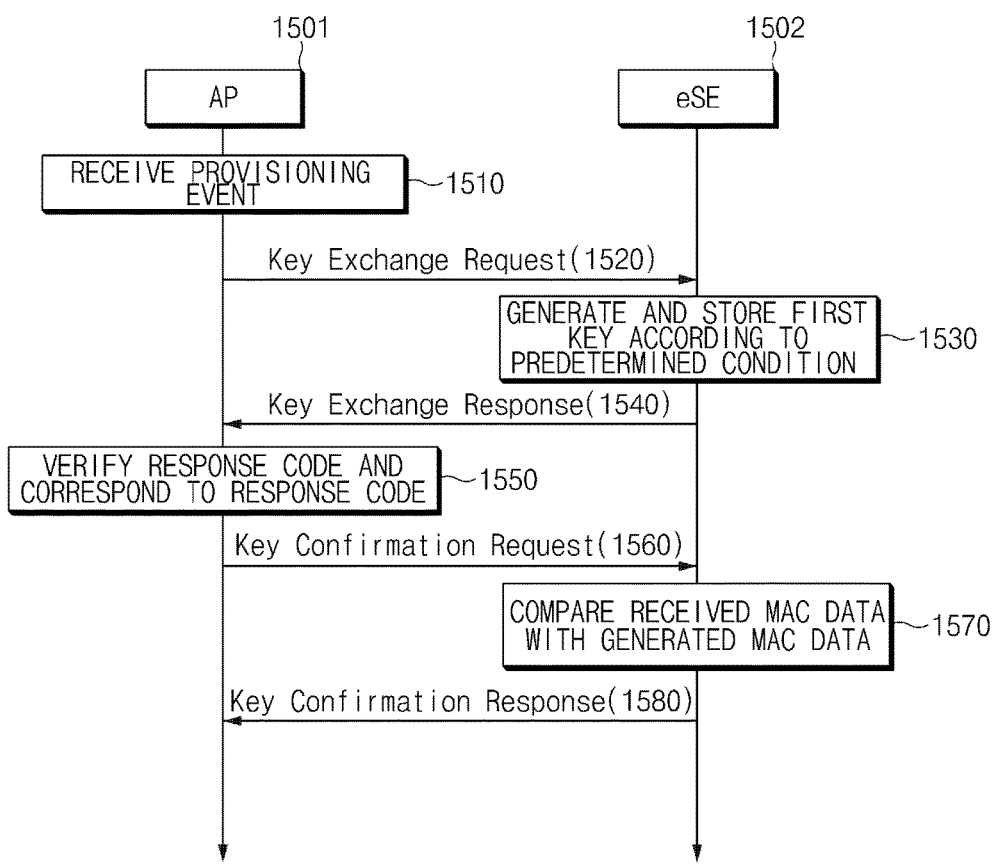
FIGS. 15A and 15B are signal sequence diagrams illustrating a provisioning method of an eSE, according to an embodiment of the present disclosure.

FIG. 15A is a signal sequence diagram illustrating a provisioning method of an eSE, according to an embodiment of the present disclosure. The provisioning process may be a process of sharing a key between the processor 1310 and the eSE 1320 of FIG. 13.

Referring to FIG. 15A, in step 1510, a processor 1510 (e.g., an application processor (AP)) receives a provisioning event. The provisioning event may be a start signal for starting a provisioning process. The provisioning event may be an event for receiving a provisioning request from an external device. The provisioning request may be an attention (AT) command of a key generation management device or an over the air (OTA) message of an external server which has the right to manage an eSE 1502.

The provisioning event may be a predetermined event which occurs in the electronic device 1301. The provisioning event may be at least one of if a key is not stored in the eSE 1502 when the electronic device 1301 is booted, if there is no history of checking a flag indicating information about history of performing provisioning when the electronic device 1301 is booted, or if a key is not stored in the eSE 1502 when receiving a request to use the eSE 1502 and sending a request to connect to the eSE 1502.

If the eSE 1502 has a key in advance, the processor 1501 may end a provisioning procedure. If the eSE 1502 does not have a key in advance, the processor 1501 may continue performing a provisioning procedure of steps 1520-1580.

In step 1520, the processor 1501 sends a key exchange request to the eSE 1520 according to the provisioning event. The key exchange request may include an algorithm identifier, a process identifier, a public key according to a predetermined secure algorithm, and the like.

In step 1530, the eSE 1502 verifies a predetermined condition (e.g., information about whether there is a stored key, state information of the eSE 1502) and generates and stores a first key. For example, if there is no predetermined key and if the eSE 1502 is not in a blocked state or a terminated state, the eSE 1502 may generate and store the first key. The eSE 1502 may send an error code to the processor 1501. Information relating to the condition is provided with reference to FIG. 16. The eSE 1502 may calculate a key derivation function (KDF) according to a processor identifier, an eSE identifier, and the like and may generate and store a key.

In step 1540, the eSE 1502 sends a key exchange response to the processor 1501. If the eSE 1502 succeeds in generating and storing the key, the key exchange response may include a success code. If the eSE 1502 fails in generating and storing the key, the key exchange response may include an error code. The eSE 1502 may send a key (e.g., a public key) generated for exchanging a key with the processor 1501 and message authentication code (MAC) data to the processor 1501 as a response. The eSE 1502 may put a signature using a private key of the eSE 1502 for data integrity verification and may send the response.

In step 1550, the processor 1501 operates in response to the key exchange response. If receiving the success code, the processor 1501 may calculate a KDF by using a processor identifier, an eSE identifier, and the like as factors and may generate and store a second key. In contrast, if receiving the error code, the processor 1501 may verify the reason why the eSE 1502 fails in generating and storing the key (e.g., that the key is previously present, that the eSE 1502 is in a blocked state, and the like). The processor 1501 may perform an operation (e.g., a waiting operation, a resuming operation, a reset operation) corresponding to each error code or may provide notification to the user using at least one or more of a sound or a display such that he or she may know the notification. The processor 1501 may compare MAC data received from the eSE 1520 with MAC data directly generated by the processor 1501 to verify the validity of each of the generated keys. An operation similar to this may be performed in step 1570 by the eSE 1502. If receiving a response signed using a private key of the eSE 1502, the processor 1501 may verify a signature using a public key corresponding to the private key of the eSE 1502.

In step 1560, after generating and storing the key, the processor 1501 sends a key confirmation request to the eSE 1502 using the MAC data. The processor 1501 may put a signature using a private key of the processor 1501 for data integrity verification and may send the key confirmation request to the eSE 1502.

In step 1570, the eSE 1502 compares received MAC data with directly generated MAC data to verify the validity of each of the generated keys. In this case, the eSE 1502 may verify a signature using a public key corresponding to the private key of the processor 1501 to be similar to the above-mentioned method.

In step 1580, the eSE 1502 sends a key confirmation response to the processor 1501 according to the compared result.

Figure 15B:
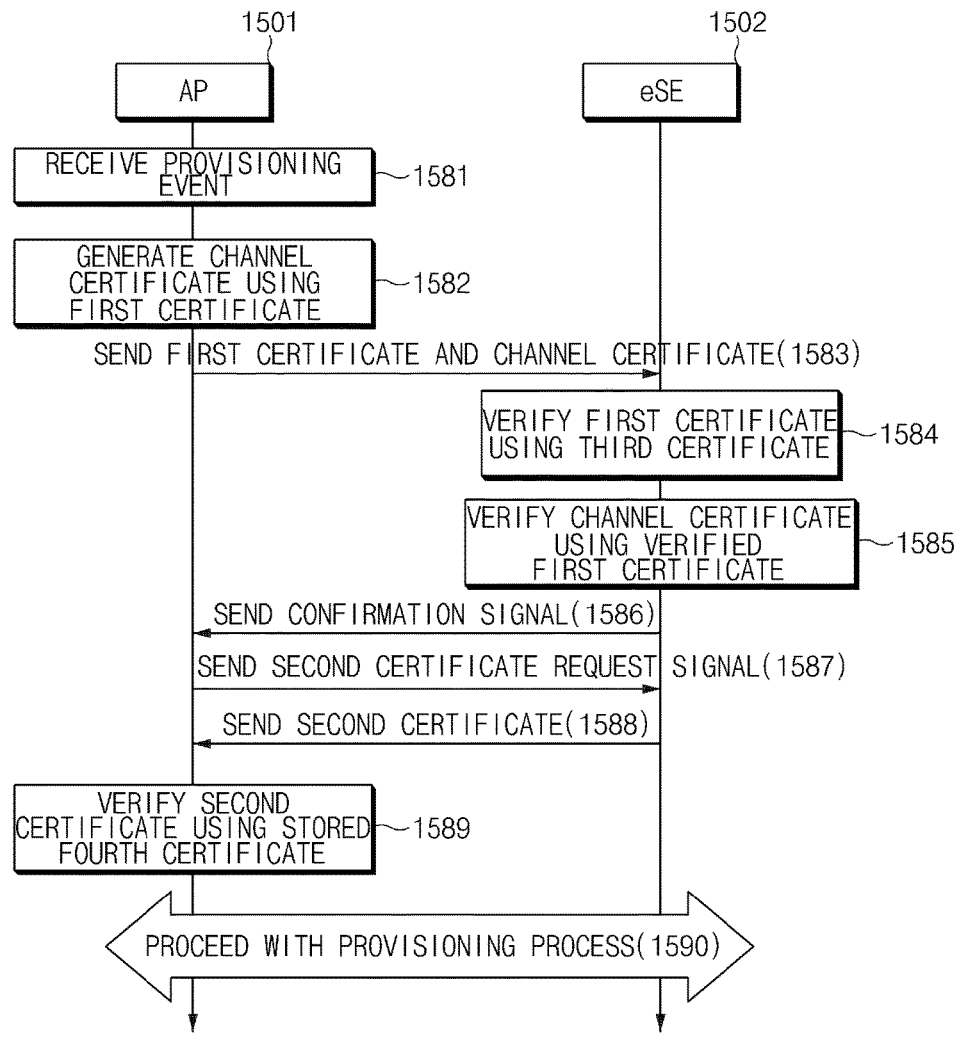

FIG. 15B is a signal sequence diagram illustrating a method for an authentication process performed before a provisioning method, according to an embodiment of the present disclosure.

Referring to FIG. 15B, the processor 1501 (e.g., an application processor (AP)) and the eSE 1502 may perform a mutual authentication process for determining whether a counterpart device is a reliable device before proceeding with a provisioning process. The processor 1501 and the eSE 1502 may exchange a certificate and may verify a signature for mutual authentication.

The processor 1501 may store a first certificate. The first certificate may be a certificate (e.g., a device root key (DRK)) for specifying an electronic device including the processor 1501. The eSE 1502 may store a second certificate. The second certificate may be a certificate (e.g., a secure session protocol (SSP) service certificate) for specifying the eSE 1502.

The eSE 1502 may store a third certificate which may verify the first certificate. The third certificate may be a root certificate of an electronic device manufacturer. The processor 1501 may store a fourth certificate which may verify the second certificate. The fourth certificate may be a root certificate of an eSE manufacturer.

The processor 1501 may store the first certificate, the third certificate, and the fourth certificate at a time when the electronic device including the processor 1501 is manufactured. Also, the eSE 1502 may store the second certificate, the third certificate, and the fourth certificate at a time when the eSE 1502 is manufactured (or before the eSE 1502 is mounted on the electronic device).

In step 1581, the processor 1501 receives a provisioning event. The provisioning event may be a start signal for starting a provisioning process, and may be received from an external device or may occur in the electronic device including the processor 1501.

In step 1582, the processor 1501 generates a channel certificate (e.g., an SSP service certificate) using the stored first certificate. The channel certificate may be previously stored at a time when the electronic device including the processor 1510 is manufactured.

The channel certificate may be generated by being signed using a private key corresponding to the first certificate which is a device certificate. The channel certificate may be signed in various signature methods (e.g., the Rivest Shamir Adleman (RSA) signature method and the elliptic curve cryptosystem (ECC) signature method). The channel certificate may be a certificate for establishing a secure channel with the predetermined eSE 1502. The processor 1501 may generate a channel certificate and a private key corresponding to the channel certificate.

In step 1583, the processor 1501 sends the first certificate and the channel certificate to the eSE 1502.

In step 1584, the eSE 1502 verifies the received first certificate using the previously stored third certificate. The third certificate may be the root certificate of the electronic device manufacturer. The third certificate may be previously stored at a time when the eSE 1502 is manufactured (or before the eSE 1502 is mounted on the electronic device).

The eSE 1502 may unsign a signature of the first certificate and may verify the first certificate, using a public key included in the third certificate.

In step 1585, the eSE 1502 verifies a channel certificate using the verified first certificate. The eSE 1502 may unsign a signature of the channel certificate and may verify the channel certificate, using a public key included in the first certificate.

If the first certificate and the channel certificate are valid, in step 1586, the eSE 1502 may send a confirmation signal to the processor 1501.

In step 1587, the processor 1501 sends a signal for requesting the second certificate to the eSE 1502.

In step 1588, the eSE 1502 sends the second certificate (e.g., an SSP service certificate) to the processor 1501.

In step 1589, the processor 1501 may verify the second certificate received from the eSE 1502 using the previously stored fourth certificate. The fourth certificate may be the root certificate of the eSE manufacturer. The fourth certificate may be previously stored in a memory at a time when the electronic device including the processor 1501 is manufactured.

The processor 1501 may unsign a signature of the second certificate and may verify the second certificate, using a public key included in the fourth certificate.

In step 1590, the processor 1501 and the eSE 1502 perform a provisioning process using the channel certificate and a secure channel certificate. The processor 1501 and the eSE 1502 may sign messages, such as a key exchange request, a key exchange response, a key confirmation request, and a key confirmation response, using a private key corresponding to each certificate and may verify integrity of each of the messages.

The processor 1501 and the eSE 1502 may sign a message using a public key randomly generated in a session communication process or a reset process and a private key corresponding to a communicated certificate, may verify integrity, and may generate and store a first key and a second key.

Figure 16:
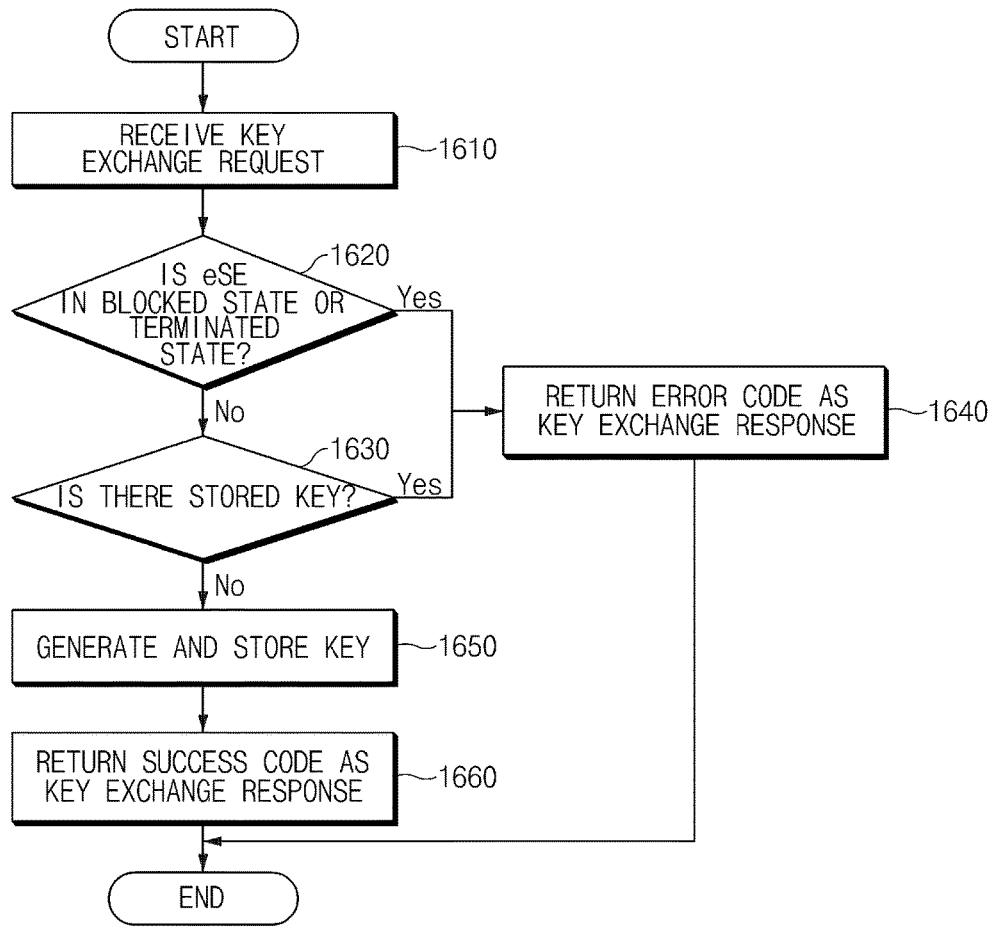
FIG. 16 is a flowchart illustrating a method for a key generation process of an eSE, according to an embodiment of the present disclosure.

FIG. 16 is a flowchart illustrating a method for a key generation process of an eSE, according to an embodiment of the present disclosure.

Referring to FIG. 16, in step 1610, the eSE 1502 receives a key exchange request from the processor 1501. The key exchange request may include an algorithm identifier, a process identifier, a public key according to a predetermined secure algorithm, and the like.

In step 1620, the eSE 1502 determines whether the eSE 1502 is in a blocked state or a terminated state. The blocked state may be a state where a reset process of the eSE 1502 fails a predetermined number or more of times (e.g., five times or more). The terminated state may be a state where an operation by a critical attack (e.g., physical damage and the like) is terminated.

If the eSE 1502 is not in the blocked state or the terminated state, in step 1630, the eSE 1502 determines whether there is a previously stored key.

If the eSE 1502 is in the blocked state or the terminated state and if there is the previously stored key, in step 1640, the eSE 1502 returns an error code as a key exchange response to the processor 1501. Steps 1620-1630 may simultaneously proceed or the order of steps 1620-1630 may be changed.

If there is no separately stored key, in step 1650, the eSE 1502 generates and stores a key. The eSE 1502 may calculate a KDF according to a processor identifier, an eSE identifier, and the like and may generate and store the key.

In step 1660, the eSE 1502 returns a success code as a key exchange response to the processor 1501.

Figure 17:
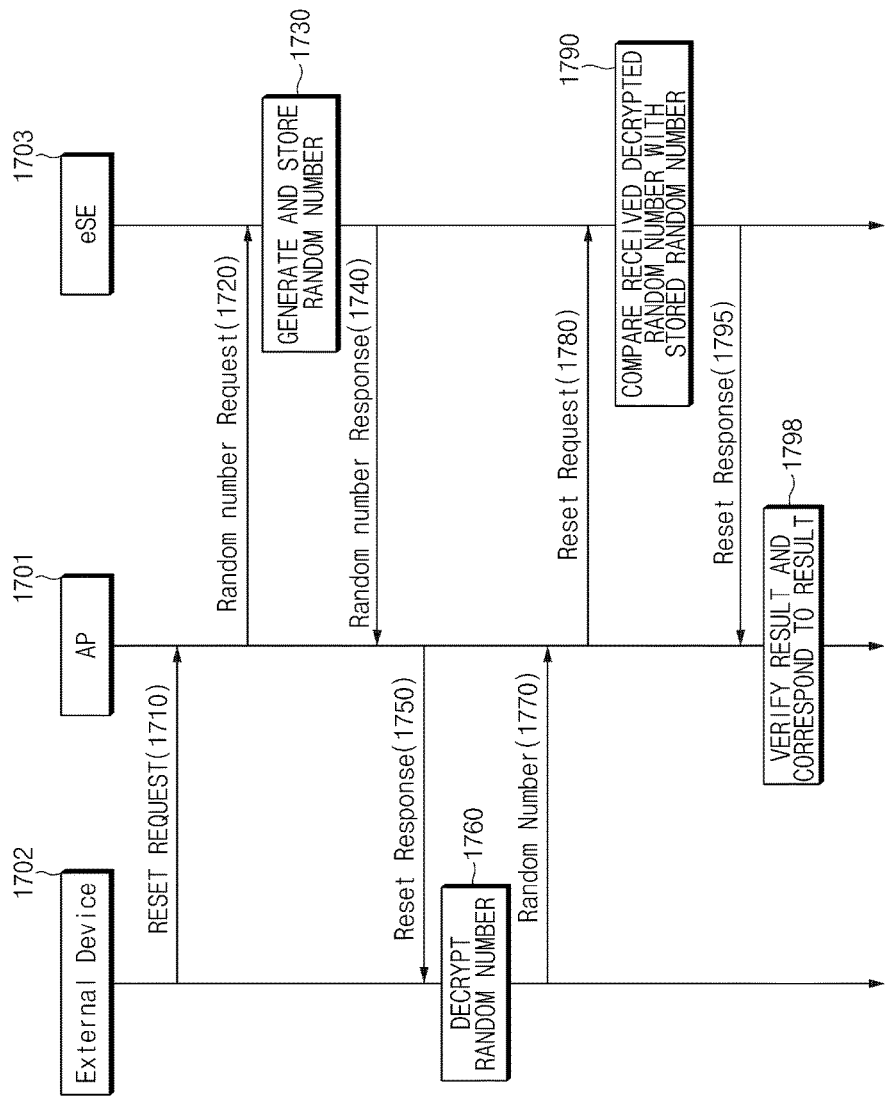
FIG. 17 is a signal sequence diagram illustrating a method for a key reset process of an eSE, according to an embodiment of the present disclosure.

FIG. 17 is a signal sequence diagram illustrating a method for a key reset process of an eSE, according to an embodiment of the present disclosure. A processor 1701 (e.g., an application processor (AP)) and an eSE 1703 may communicate a signal about a reset related request and response over the physical channel 1350 of FIG. 13.

Referring to FIG. 17, in step 1710, the processor 1701 receives a reset request from an external device 1702 (e.g., a secure safety device, a service server, and the like). The reset request may be an AT command of the external device 1702 or may be an OTA message of an external server which has the right to manage the eSE 1703.

In step 1720, the processor 1701 sends a request to generate a random number for verifying the right to reset the processor 1701 to the eSE 1703. The processor 1701 may send the request to generate the random number using a data format corresponding to specifications of an APDU to the eSE 1703. For example, the processor 1701 may not fill a data field and may generate and send data using only a parameter of a header.

In step 1730, the eSE 1703 generates and stores the random number according to the request to generate the random number. The eSE 1703 may encrypt a random number generated using a public key previously shared with the external device 1702.

In step 1740, the eSE 1703 returns the encrypted random number to the processor 1701. The random number may be sent over the physical channel 1350.

In step 1750, the processor 1701 sends the encrypted random number to the external device 1702.

In step 1760, the external device 1702 decrypts the encrypted random number using a private key corresponding to a public key. An external device which requests the processor 1701 to reset the processor 1701 and an external device which decrypts the random number may be different from each other. For example, a first external device may request the processor 1701 to reset the processor 1701. Thereafter, if receiving an encrypted random number from the processor 1701, the first external device may send a request to decrypt the random number to a second external device having a private key and may receive a response to the request.

In step 1770, the external device 1702 sends the decrypted random number to the processor 1701.

In step 1780, the processor 1701 sends a reset request to the eSE 1703 according to the encrypted random number.

In step 1790, the eSE 1703 compares the received encrypted random number with a stored random number to determine whether to delete a key of the processor 1701 according to a predetermined condition. For example, if the received encrypted random number is the same as the stored random number, the eSE 1703 may delete the key of the processor 1701 and may send a reset event to an installed applet. Information relating to the predetermined condition is provided with reference to FIG. 18.

In step 1795, the eSE 1703 provides a response about whether to delete the key of the processor 1701 to the processor 1701.

In step 1798, the processor 1701 verifies a result about whether to delete the key and may perform a corresponding operation. For example, if the eSE 1703 succeeds in deleting the key, the processor 1701 deletes the stored key.

Figure 18:
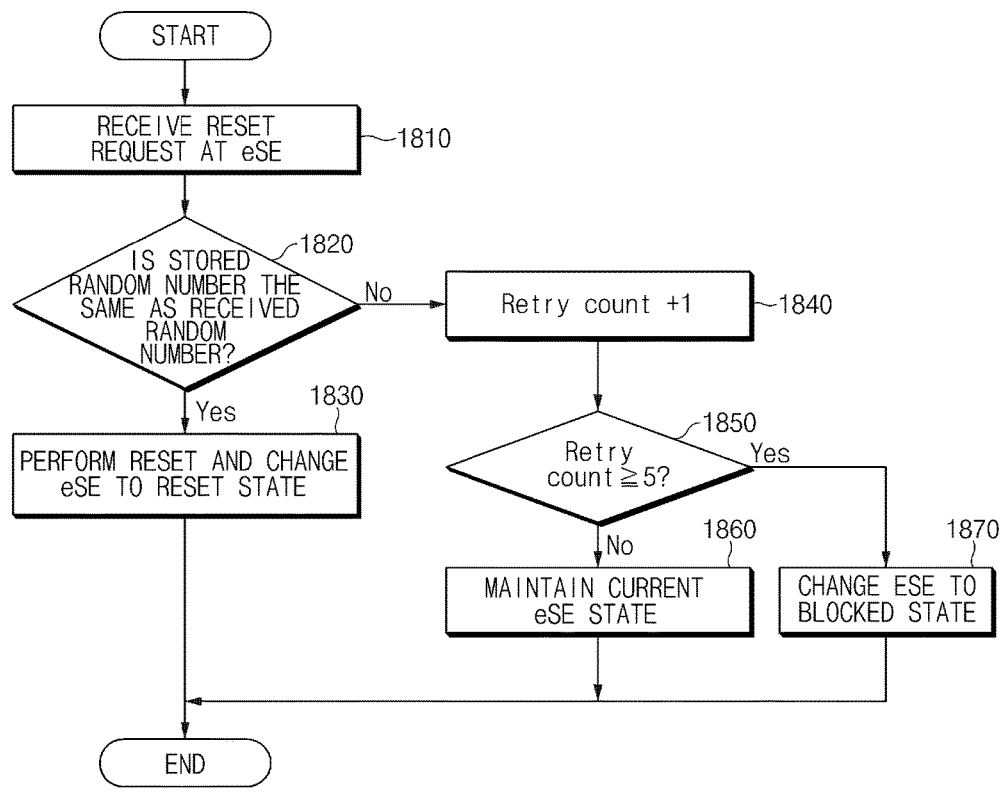
FIG. 18 is a flowchart illustrating a method for a key reset process of an eSE, according to an embodiment of the present disclosure.

FIG. 18 is a flowchart illustrating a method for a key reset process of an eSE, according to an embodiment of the present disclosure.

Referring to FIG. 18, in step 1810, the eSE 1703 y receives a reset request from the processor 1701. The processor 1701 may send a random number encrypted through the external device 1702 to the eSE 1703.

In step 1820, the eSE 1703 determines whether the received decrypted random number is the same as a stored random number.

If the received decrypted random number is the same as the stored random number, in step 1830, the eSE 1703 resets a key and may change its state to a reset state.

If the received decrypted random number is different from the stored random number, in step 1840, the eSE 1703 increases the number of times failure occurs by 1.

In step 1850, the eSE 1703 determines whether the number of times failure occurs is greater than or equal to a predetermined value (e.g., five times).

If the number of times failure occurs is less than the predetermined value (e.g., five times), in step 1860, the eSE 1703 maintains a current key and may inform the processor 1701 that a key is not changed.

If the number of times failure occurs is greater than or equal to the predetermined value (e.g., five times), in step 1870, the eSE 1703 changes its state to a blocked state.

Figure 19:
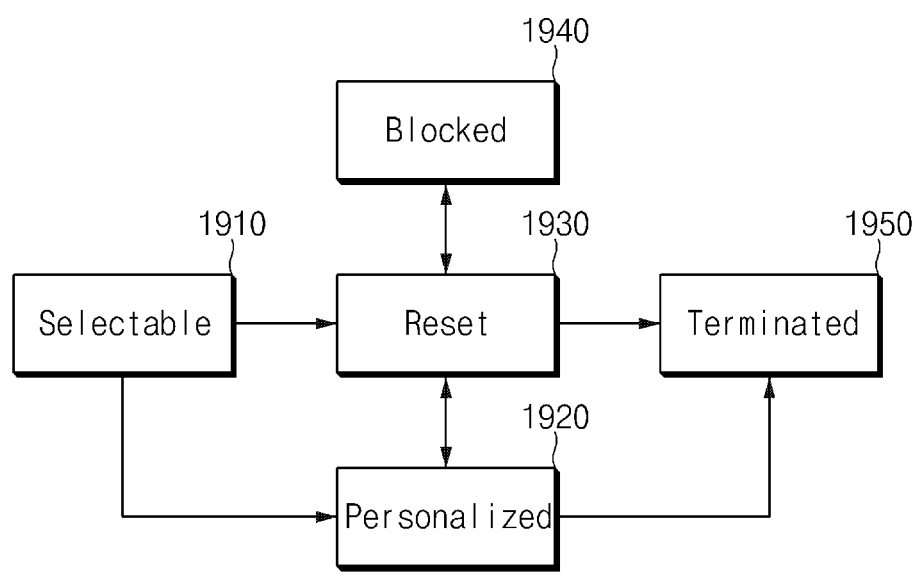
FIG. 19 is a diagram illustrating a state change of an eSE, according to an embodiment of the present disclosure.

FIG. 19 is a diagram illustrating a state change of an eSE, according to an embodiment of the present disclosure.

Referring to FIG. 19, the eSE 1320 of FIG. 13 may be in one of a selectable state 1910, a personalized state 1920, a reset state 1930, a blocked state 1940, and a terminated state 1950.

The selectable state 1910 may be an initial state for waiting for generating a key of the eSE 1320. The personalized state 1920 may be a state where after a provisioning procedure proceeds, a key is generated in the eSE 1320 and the key is shared with the secure environment 1340 of the processor 1310 of FIG. 13. The reset state 1930 may be a state where a reset procedure proceeds and a key is deleted from the eSE 1320.

The blocked state 1940 may be a state where a reset process of the eSE 1320 fails a predetermined number of times or more (e.g., five times or more). The terminated state 1950 may be a state where an operation is terminated by a critical attack (e.g., a physical damage).

A state of the eSE 1320 may be changed through the provisioning procedure or the reset procedure, and the like, and the eSE 1320 may operate according to the changed state. For example, if the eSE 1320 is in the blocked state or the terminated state, the provisioning procedure is blocked and an access to an inner data of the eSE 1320 is limited.

Figure 20:
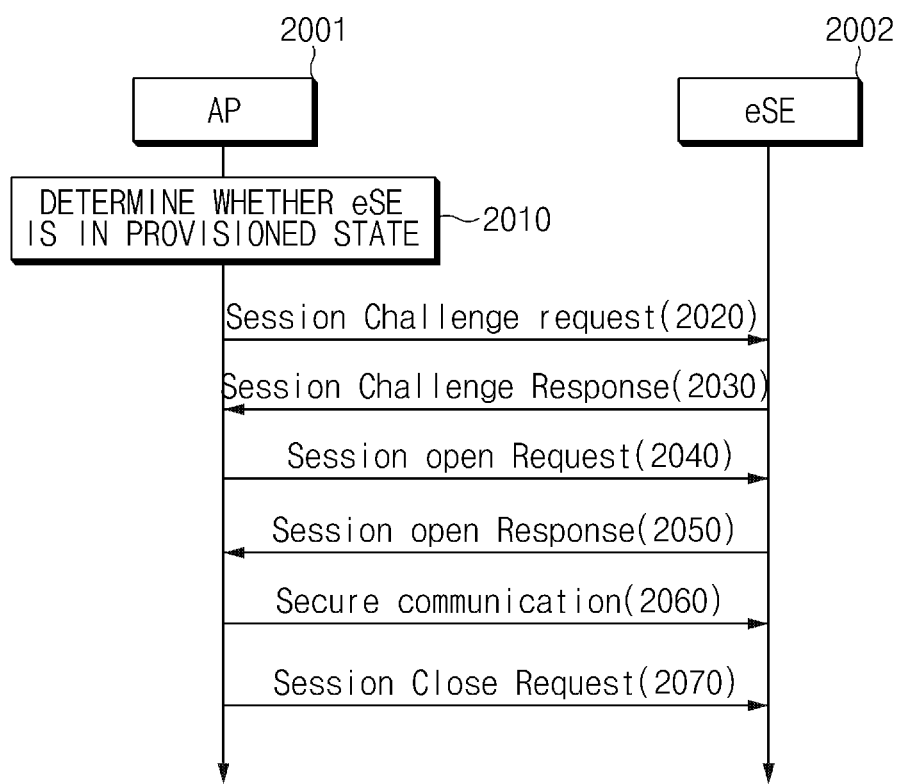
FIG. 20 is a signal sequence diagram illustrating data transmission over a physical channel after provisioning, according to an embodiment of the present disclosure.

FIG. 20 is a signal sequence diagram illustrating data transmission over a physical channel after provisioning, according to an embodiment of the present disclosure. A processor 2001 (e.g., an AP) may open a session and may communicate important information, such as payment information or user authentication information, with an eSE 2002.

Referring to FIG. 20, in step 2010, the processor 2001 determines whether the eSE 2002 is provisioned. If the processor 2001 and the eSE 2002 are provisioned, the processor 2001 may encrypt data according to a shared key and may communicate the encrypted data with each other.

In step 2020, the processor 2001 attempts to establish a session for starting to send data to the eSE 2002. The processor 2001 may attempt to establish the session according to an app identifier, an identifier of an applet of the eSE 2002, or a generated first session random number, and the like.

In step 2030, the eSE 2002 sends a response signal to attempting to establish the session. The eSE 2002 may generate a second session random number and may reply using the generated second session random number and a MAC data of a session challenge request.

In step 2040, the processor 2001 sends a session open request to the eSE 2002. The processor 2001 may generate a first session open vector and may send the session open request including the first session open vector and MAC data of a session challenge response to the eSE 2002.

In step 2050, the eSE 2002 sends a response signal to the session open request of the processor 2001 to the processor 2001. The eSE 2002 may generate a second session open vector and may send a response signal as MAC data for the second session open vector to the processor 2001.

In step 2060, the processor 2001 performs secure communication through the session. The processor 2001 may be configured to separately store information (e.g., secure information) requested to have a high secure level in the eSE 2002 and to communicate the information with an encrypted form. The processor 2001 may request the eSE 2002 to store the secure information through the session. The secure information may include a payment token, biometrics information, such as FP information, or information about a cryptographic key.

The processor 2001 may delete the secure information. The deleting of the secure information may be performed after it is determined that the storing of the secure information in the eSE 2002 is completed. The processor 2001 may delete the secure information and may store the secure information in only the eSE 2002 to strengthen security.

In step 2070, the processor 2001 sends a session close request to the eSE 2002.

If needing information stored in the eSE 2002, the processor 2001 may verify a position to store the information, may open a session, and may request the eSE 2002 to send the stored information, and may receive the stored information. After receiving the information, the processor 2001 may close the session. If the use of the secure information is completed, the processor 2001 may immediately delete the secure information to strengthen security.

An electronic device may include a processor configured to operate to be independent of a general environment and a secure environment, a memory, an eSE configured to store a cryptographic key and to be independent of the memory, and a channel configured to directly connect the secure environment with the eSE.

The secure environment may include an SP module configured to manage the cryptographic key and an APDU communication engine. The SP module may encrypt data according to the cryptographic key. The cryptographic key may be configured to correspond to a key stored in the eSE.

The electronic device may further include an NFC module. The NFC module may connect with the general environment and the eSE over a connection channel. The connection channel may be configured to be independent of a physical channel.

If a provisioning event occurs, the secure environment may send a key exchange request signal to the eSE. If there is a key stored in the eSE or if the eSE is in a blocked state or a terminated state, the eSE may send a corresponding error code to the secure environment. If there is no key stored in the eSE, the eSE may be configured to generate and store a first key and to send a success code to the secure environment.

The secure environment may be configured to generate and store a second key according to information about the first key and to send a confirmation request for the second key to the eSE. The eSE may be configured to determine whether the second key and the first key correspond to each other by comparing information about the second key with the information about the first key and to send the determined result to the secure environment.

The provisioning event may be an event of receiving a provisioning request from an external device. The general environment may be configured to send information about occurrence of the provisioning event to the secure environment. The provisioning event may be at least one of booting which occurs in the electronic device, a flag check, or a use request of the eSE.

If receiving a reset request of the eSE from an external device, the secure environment may send a random number generation request signal to the eSE. The eSE may encrypt a random number generated using a public key previously shared with the external device and may send the encrypted random number to the secure environment. The secure environment may send the encrypted random number to the external device through the general environment. If receiving a decrypted random number, the secure environment may send the received decrypted random number to the eSE.

If the received decrypted random number is the same as a stored random number, the eSE may delete a key and may enter a reset state. If the received decrypted random number is different from the stored random number and if the number of times failure occurs is greater than or equal to a predetermined value, the eSE may enter a blocked state.

If sharing a key with the eSE, the secure environment may be configured to open a session according to the key and to store predetermined information in the eSE.

A communication method performed in an electronic device including a processor and an eSE may include receiving, by the processor, a provisioning event, sending, by the processor, a key exchange request to the eSE according to the provisioning event, verifying, by the eSE, a predetermined condition and generating and storing, by the eSE, a first key, and generating and storing, by the processor, a second key corresponding to the first key if the first key is generated.

The communication method may further include sending, by the processor, a confirmation request for the second key to the eSE and comparing, by the eSE, information about the second key with information about the first key and sending, by the eSE, the compared result to the secure environment.

Figure 21:
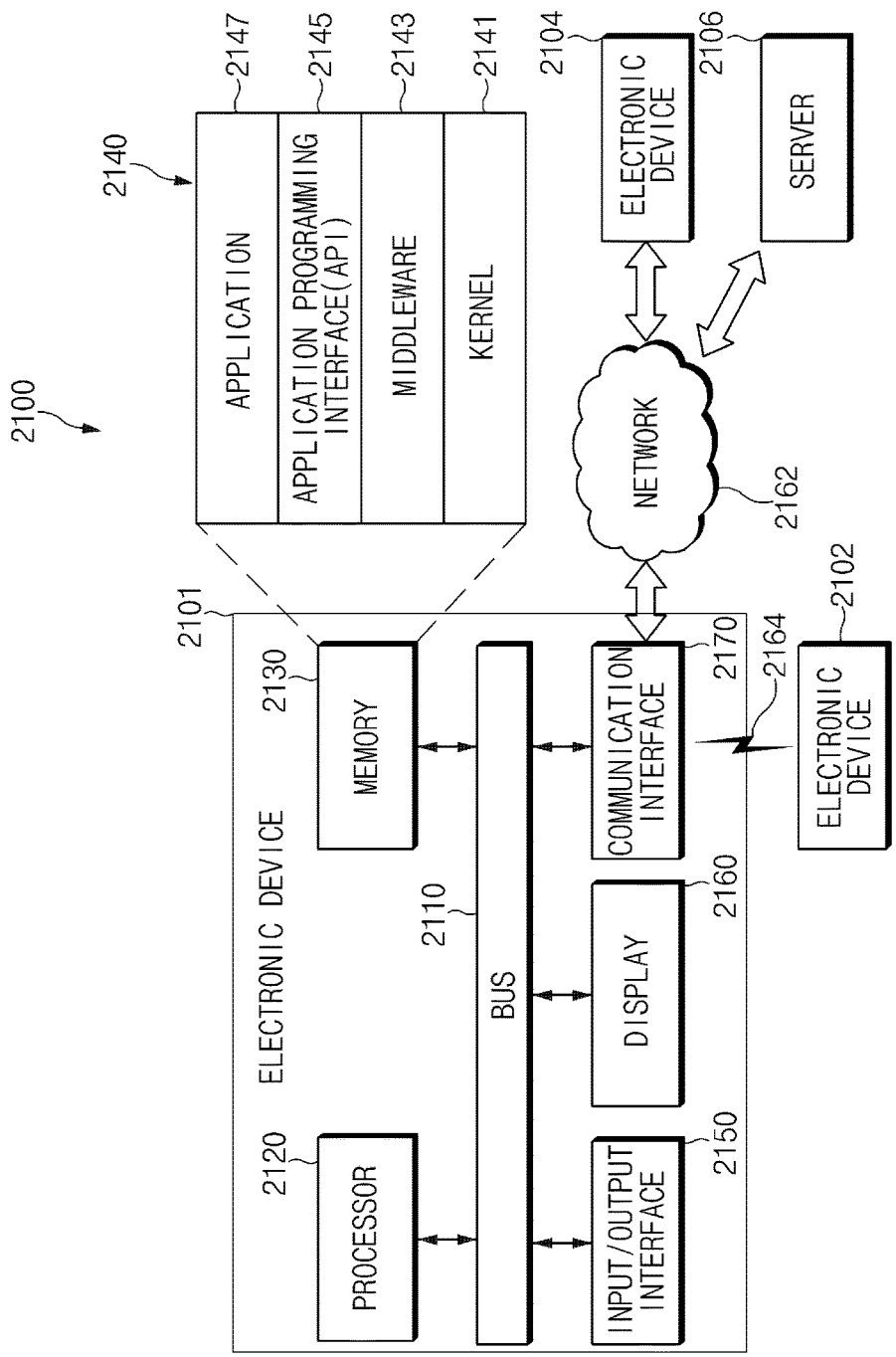
FIG. 21 is a diagram illustrating a configuration of an electronic device in a network environment, according to an embodiment of the present disclosure.

FIG. 21 is a diagram illustrating a configuration of an electronic device in a network environment, according to an embodiment of the present disclosure.

Referring to FIG. 21, an electronic device 2101 in a network environment 2100 is described, according to an embodiment of the present disclosure. The electronic device 2101 includes a bus 2110, a processor 2120, a memory 2130, an input and output interface 2150, a display 2160, and a communication interface 2170. At least one of the components of the electronic device 2101 may be omitted from the electronic device 2101 or another component may be additionally included in the electronic device 2101.

The bus 2110 may be, for example, a circuit which may connect the components 2110-2170 with each other and may transmit communication (e.g., a control message and/or data) between the components.

The processor 2120 may include one or more of a CPU, an AP, and a CP. The processor 2120 may execute, for example, calculation or data processing about control and/or communication of at least another component of the electronic device 2101.

The memory 2130 may include a volatile memory and/or a non-volatile memory. For example, the memory 2130 may store instructions or data associated with at least another component of the electronic device 2101. The memory 2130 may store software and/or a program 2140. The program 2140 may include, for example, a kernel 2141, a middleware 2143, an API 2145, and/or an application program 2147 (or "an application"). At least part of the kernel 2141, the middleware 2143, or the API 2145 may be referred to as an OS.

The kernel 2141 may control or manage, for example, system resources (e.g., the bus 2110, the processor 2120, or the memory 2130, and the like) used to execute an operation or function implemented in the other programs (e.g., the middleware 2143, the API 2145, or the application program 2147). Also, as the middleware 2143, the API 2145, or the application program 2147 accesses a separate component of the electronic device 2101, the kernel 2141 may provide an interface which may control or manage system resources.

The middleware 2143 may be a go-between such that the API 2145 or the application program 2147 communicates with the kernel 2141 to communicate data with the kernel 2141.

Also, the middleware 2143 may process one or more work requests, received from the application program 2147, in order of priorities. For example, the middleware 2143 may provide priorities which may use system resources (e.g., the bus 2110, the processor 2120, or the memory 2130, and the like) of the electronic device 2101 to the application program 2147. For example, the middleware 2143 may perform scheduling or load balancing for the one or more work requests by processing the one or more work requests in order of the priorities provided to the application program 2147.

The API 2145 may be, for example, an interface in which the application program 2147 controls a function provided from the kernel 2141 or the middleware 2143. For example, the API 2145 may include at least one interface or function (e.g., instruction) for file control, window control, image processing, or text control, and the like.

The input and output interface 2150 may be an interface which may transmit instructions or data input from a user or another external device to another component (or other components) of the electronic device 2101. Also, input and output interface 2150 may output instructions or data received from another component (or other components) of the electronic device 2101 to the user or the other external device.

The display 2160 may include, for example, a liquid crystal display (LCD), a light emitting diode (LED) display, an organic LED (OLED) display, a microelectromechanical systems (MEMS) display, or an electronic paper display. The display 2160 may display, for example, a variety of content (e.g., text, images, videos, icons, or symbols, and the like) to the user. The display 2160 may include a touch screen, and may receive, for example, touch, gesture, proximity, or a hovering input using an electronic pen or part of a body of the user.

The communication interface 2170 may establish communication between, for example, the electronic device 2101 and an external device (e.g., a first external electronic device 2102, a second external electronic device 2104, or a server 2106). For example, the communication interface 2170 may connect to a network 2162 through wireless communication or wired communication and may communicate with the second external electronic device 2104 or the server 2106.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 2164. The local-area communication 2164 may include, for example, at least one of wireless-fidelity (Wi-Fi) communication, Bluetooth (BT) communication, near field communication (NFC), or global navigation satellite system (GNSS) communication, and the like. A GNSS may include, for example, at least one of a global positioning system (GPS), a Glonass system, a Beidou navigation satellite system (hereinafter referred to as a "Beidou"), or a Galileo (i.e., the European global satellite-based navigation system) according to an available area or a bandwidth, and the like. Hereinafter, "GPS" used herein may be interchangeably with "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 2162 may include a telecommunications network, for example, at least one of a computer network (e.g., a local area network (LAN) or a wide area network (WAN)), the Internet, or a telephone network.

Each of the first and second external electronic devices 2102 and 2104 may be the same as or different device from the electronic device 2101. The server 2106 may include a group of one or more servers. All or some of operations executed in the electronic device 2101 may be executed in another electronic device or in the first and second external electronic devices 2102 and 2104 or the server 2106. If performing any function or service automatically or according to a request, the electronic device 2101 may request the first and second external electronic devices 2102 and 2104 or the server 2106 to perform at least a partial function associated with the function or service, rather than executing the function or service for itself or in addition to the function or service. The first and second external electronic devices 2102 and 2104 or the server 2106 may execute the requested function or the added function and may transmit the executed result to the electronic device 2101. The electronic device 2101 may process the received result without change or may provide the requested function or service. For this purpose, for example, cloud computing technologies, distributed computing technologies, or client-server computing technologies may be used.

Figure 22:
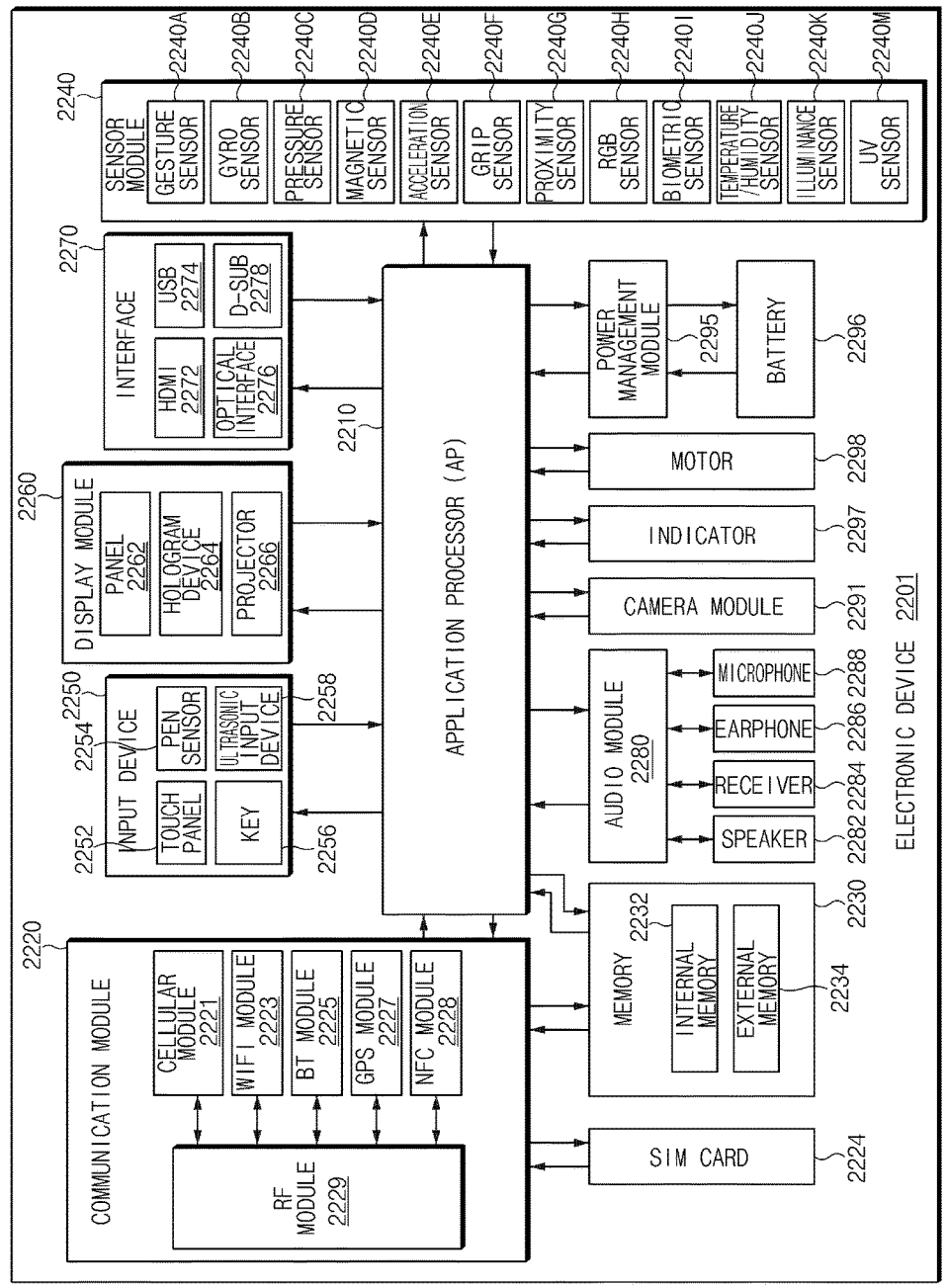
FIG. 22 is a diagram illustrating a configuration of an electronic device, according to an embodiment of the present disclosure.

FIG. 22 is a diagram illustrating a configuration of an electronic device 2201, according to an embodiment of the present disclosure. The electronic device 2201 may include, for example, all or part of an electronic device 2101 shown in FIG. 21. The electronic device 2201 includes one or more processors 2210 (e.g., application processors (APs)), a communication module 2220, a subscriber identification module (SIM) 2224, a memory 2230, a sensor module 2240, an input device 2250, a display 2260, an interface 2270, an audio module 2280, a camera module 2291, a power management module 2295, a battery 2296, an indicator 2297, and a motor 2298.

The processor 2210 may drive, for example, an OS or an application program to control a plurality of hardware or software components connected thereto and may process and compute a variety of data. The processor 2210 may be implemented with, for example, a system on chip (SoC). The processor 2210 may further include a graphic processing unit (GPU) and/or an image signal processor. The processor 2210 may include at least some (e.g., a cellular module 2221) of the components shown in FIG. 22. The processor 2210 may load instructions or data received from at least one of other components (e.g., a non-volatile memory) to a volatile memory to process the data and may store various data in a non-volatile memory.

The communication module 2220 may have the same or similar configuration as or to that of a communication interface 2170 of FIG. 21. The communication module 2220 may include, for example, the cellular module 2221, a Wi-Fi module 2223, a BT module 2225, a GNSS module 2227 (e.g., a GPS module, a Glonass module, a Beidou module, or a Galileo module), an NFC module 2228, and a radio frequency (RF) module 2229.

The cellular module 2221 may provide, for example, a voice call service, a video call service, a text message service, or an Internet service, and the like through a communication network. The cellular module 2221 may identify and authenticate the electronic device 2201 in a communication network using the SIM 2224. The cellular module 2221 may perform at least some of functions which may be provided by the processor 2210. The cellular module 2221 may include a communication processor (CP).

The Wi-Fi module 2223, the BT module 2225, the GNSS module 2227, or the NFC module 2228 may include, for example, a processor for processing data transmitted and received through the corresponding module. At least some (e.g., two or more) of the cellular module 2221, the Wi-Fi module 2223, the BT module 2225, the GNSS module 2227, or the NFC module 2228 may be included in one integrated chip (IC) or one IC package.

The RF module 2229 may transmit and receive, for example, a communication signal (e.g., an RF signal). Though not shown, the RF module 2229 may include, for example, a transceiver, a power amplifier module (PAM), a frequency filter, or a low noise amplifier (LNA), or an antenna, and the like. At least one of the cellular module 2221, the Wi-Fi module 2223, the BT module 2225, the GNSS module 2227, or the NFC module 2228 may transmit and receive an RF signal through a separate RF module.

The SIM 2224 may include, for example, a card which includes an embedded SIM. The SIM 2224 may include unique identification information (e.g., an integrated circuit card identifier (ICCID)) or subscriber information (e.g., an international mobile subscriber identity (IMSI)).

The memory 2230 may include, for example, an embedded memory 2232 or an external memory 2234. The embedded memory 2232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 2234 may further include a flash drive, for example, a compact flash (CF), a secure digital (SD), a micro-SD, a mini-SD, an extreme digital (xD), or a memory stick, and the like. The external memory 2234 may functionally and/or physically connect with the electronic device 2201 through various interfaces.

The sensor module 2240 may measure, for example, a physical quantity or may detect an operation state of the electronic device 2201, and may convert the measured or detected information to an electric signal. The sensor module 2240 may include at least one of, for example, a gesture sensor 2240A, a gyro sensor 2240B, a barometric pressure sensor 2240C, a magnetic sensor 2240D, an acceleration sensor 2240E, a grip sensor 2240F, a proximity sensor 2240G, a color sensor 2240H (e.g., red, green, blue (RGB) sensor), a biometric sensor 2240I, a temperature/humidity sensor 2240J, an illumination sensor 2240K, or an ultraviolet (UV) sensor 2240M. Additionally or alternatively, the sensor module 2240 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 2240 may further include a control circuit for controlling at least one or more sensors included therein. The electronic device 2201 may further include a processor configured to control the sensor module 2240, as part of the processor 2210 or to be independent of the AP 1010. While the processor 2210 is in a sleep state, the electronic device 2201 may control the sensor module 2240.

The input device 2250 may include, for example, a touch panel 2252, a (digital) pen sensor 2254, a key 2256, or an ultrasonic input unit 2258. The touch panel 2252 may recognize a touch input using at least one of, for example, a capacitive detecting method, a resistive detecting method, an infrared detecting method, or an ultrasonic detecting method. Also, the touch panel 2252 may further include a control circuit. The touch panel 2252 may further include a tactile layer and may provide a tactile reaction to a user.

The (digital) pen sensor 2254 may be, for example, part of a touch panel or may include a separate sheet for recognition. The key 2256 may include, for example, a physical button, an optical key, or a keypad. The ultrasonic input unit 1058 may allow the electronic device 2201 to detect a sound wave using a microphone 2288 and to verify data through an input tool generating an ultrasonic signal.

The display module 2260 may include a panel 2262, a hologram device 2264, or a projector 2266. The panel 2262 may include the same or similar configuration as or to that of the display 2260. The panel 2262 may be implemented to be, for example, flexible, transparent, or wearable. The panel 2262 and the touch panel 2252 may be integrated into one module. The hologram device 2264 may show a stereoscopic image in a space using interference of light. The projector 2266 may project light onto a screen to display an image. The screen may be positioned, for example, inside or outside the electronic device 2201. The display 2260 may further include a control circuit for controlling the panel 2262, the hologram device 2264, or the projector 2266.

The interface 2270 may include, for example, an HDMI 2272, a USB 2274, an optical interface 2276, or a D-subminiature 2278. The interface 2270 may be included in, for example, the communication interface 2170 shown in FIG. 21. Additionally or alternatively, the interface 2270 may include, for example, a mobile high definition link (MHL) interface, an SD card/multimedia card (MMC) interface, or an infrared data association (IrDA) standard interface.

The audio module 2280 may convert a sound and an electric signal in dual directions. At least some of components of the audio module 2280 may be included in, for example, the input and output interface 2150 shown in FIG. 21. The audio module 2280 may process sound information input or output through, for example, a speaker 2282, a receiver 2284, an earphone 2286, or the microphone 2288, and the like. The microphone 2288 included in the audio module 2280 may collect audio data which may be used as input information and remote authentication information or local authentication information.

The camera module 2291 may be a device which captures a still image and a moving image. The camera module 2291 may include one or more image sensors (e.g., a front sensor or a rear sensor), a lens, an image signal processor (ISP), or a flash (e.g., an LED or a xenon lamp).

The power management module 2295 may manage, for example, power of the electronic device 2201. The power management module 2295 may include a power management integrated circuit (PMIC), a charger IC or a battery gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 2296 and voltage, current, or temperature thereof while the battery 2296 is charged. The battery 2296 may include, for example, a rechargeable battery or a solar battery.

The indicator 2297 may display a specific state of the electronic device 2201 or part (e.g., the processor 2210) thereof, for example, a booting state, a message state, or a charging state, and the like. The motor 2298 may convert an electric signal into mechanical vibration and may generate vibration or a haptic effect, and the like. Though not shown, the electronic device 2201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFlo™ standard, and the like.

Each of the above-mentioned elements of the electronic device 2201 may be configured with one or more components, and names of the corresponding elements may be changed according to the type of the electronic device. The electronic device 2201 may include at least one of the above-mentioned elements, some elements may be omitted from the electronic device 2201, or other additional elements may be further included in the electronic device 2201. Also, some of the elements of the electronic device 2201 may be combined with each other to form one entity, thereby making it possible to perform the functions of the corresponding elements in the same manner as before the combination.

Figure 23:
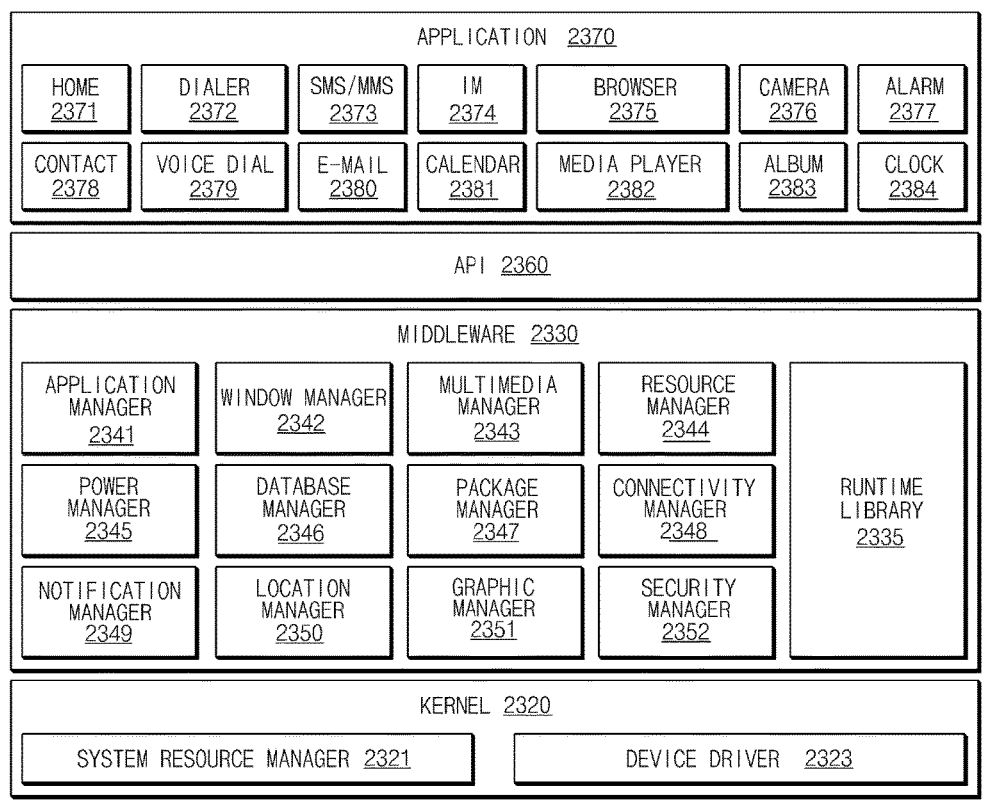
FIG. 23 is a diagram illustrating a configuration of a program module, according to an embodiment of the present disclosure.

FIG. 23 is a diagram illustrating a configuration of a program module, according to an embodiment of the present disclosure. A program module 2310 may include an OS for controlling resources associated with an electronic device (e.g., an electronic device 2101 of FIG. 21) and/or various applications (e.g., an application 2147 of FIG. 21) which are executed on the OS. The OS may be, for example, Android™, iOS™, Windows™ Symbian™, Tizen™, or Bada™, and the like.

The program module 2310 includes a kernel 2320, a middleware 2330, an API 2360, and/or an application 2370. At least part of the program module 2310 may be preloaded on the electronic device, or may be downloaded from an external electronic device (e.g., first and second external electronic devices 2102 and 2104 or a server 2106 of FIG. 21).

The kernel 2320 may include, for example, a system resource manager 2321 and/or a device driver 2323. The system resource manager 2321 may control, assign, or collect, and the like system resources. The system resource manager 2321 may include a process management unit, a memory management unit, or a file system management unit, and the like. The device driver 2323 may include, for example, a display driver, a camera driver, a BT driver, a shared memory driver, a USB driver, a keypad driver, a Wi-Fi driver, an audio driver, or an inter-process communication (IPC) driver.

The middleware 2330 may provide, for example, functions the application 2370 needs in common, and may provide various functions to the application 2370 through the API 2360 such that the application 2370 efficiently uses limited system resources in the electronic device. The middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include, for example, a library module used by a compiler to add a new function through a programming language while the application 2370 is executed. The runtime library 2335 may perform a function about input and output management, memory management, or an arithmetic function.

The application manager 2341 may manage, for example, a life cycle of at least one of the application 2370. The window manager 2342 may manage GUI resources used on a screen of the electronic device. The multimedia manager 2343 may ascertain a format necessary for reproducing various media files and may encode or decode a media file using a codec corresponding to the corresponding format. The resource manager 2344 may manage source codes of at least one of the application 2370, and may manage resources of a memory or a storage space, and the like.

The power manager 2345 may act together with, for example, a basic input/output system (BIOS) and the like, may manage a battery or a power source, and may provide power information necessary for an operation of the electronic device. The database manager 2346 may generate, search, or change a database to be used in at least one of the application 2370. The package manager 2347 may manage installation or update of an application distributed by a type of a package file.

The connectivity manager 2348 may manage, for example, wireless connection such as Wi-Fi connection or BT connection, and the like. The notification manager 2349 may display or notify events, such as an arrival message, an appointment, and proximity notification, by a method which is not disturbed to the user. The location manager 2350 may manage location information of the electronic device. The graphic manager 2351 may manage a graphic effect to be provided to the user or a UI related to the graphic effect. The security manager 2352 may provide all security functions necessary for system security or user authentication, and the like. When the electronic device (e.g., the electronic device 2101) has a phone function, the middleware 2330 may further include a telephony manager for managing a voice or video communication function of the electronic device.

The middleware 2330 may include a middleware module which configures combinations of various functions of the above-described components. The middleware 2330 may provide a module which specializes according to kinds of OSs to provide a differentiated function. Also, the middleware 2330 may dynamically delete some of old components or may add new components.

The API 2360 may be, for example, a set of API programming functions, and may be provided with different components according to OSs. For example, in case of Android™ or iOS™, one API set may be provided according to platforms. In case of Tizen™, two or more API sets may be provided according to platforms.

The application 2370 may include one or more of, for example, a home application 2371, a dialer application 2372, a short message service/multimedia message service (SMS/MMS) application 2373, an instant message (IM) application 2374, a browser application 2375, a camera application 2376, an alarm application 2377, a contact application 2378, a voice dial application 2379, an e-mail application 2380, a calendar application 2381, a media player application 2382, an album application 2383, a clock application 2384, a health care application (e.g., an application for measuring quantity of exercise or blood sugar level, and the like), or an environment information application (e.g., an application for providing atmospheric pressure information, humidity information, or temperature information, and the like), and the like.

The application 2370 may include an application (hereinafter referred to as "information exchange application") for exchanging information between the electronic device (e.g., the electronic device 2101) and an external electronic device (e.g., first and second external electronic devices 2102 and 2104 of FIG. 21). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device. Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device which communicates with the electronic device, an application which operates in the external electronic device, or a service (e.g., a call service or a message service) provided from the external electronic device.

The application 2370 may include an application (e.g., the health card application of a mobile medical device) which is preset according to attributes of the external electronic device. The application 2370 may include an application received from the external electronic device. The application 2370 may include a preloaded application or a third party application which may be downloaded from a server. Names of the components of the program module 2310 according to various embodiments of the present disclosure may differ according to kinds of OS s.

At least part of the program module 2310 may be implemented with software, firmware, hardware, or at least two or more combinations thereof. At least part of the program module 2310 may be implemented (e.g., executed) by, for example, a processor (e.g., a processor 2210 of FIG. 22). At least part of the program module 2310 may include, for example, a module, a program, a routine, sets of instructions, or a process, and the like for performing one or more functions.

At least part of the electronic device (e.g., modules or the functions) or the method (e.g., operations) may be implemented with, for example, instructions stored in a non-transitory computer-readable storage media which has a program module. When the instructions are executed by a processor (e.g., a processor 2120 of FIG. 21), one or more processors may perform functions corresponding to the instructions. The non-transitory computer-readable storage media may be, for example, the memory 2130 of FIG. 21.

The non-transitory computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

The non-transitory computer-readable storage media may have stored thereon a program for performing the method including obtaining data requested to perform authentication when being accessed and storing at least part of the data in an eSE connected with a processor over a physical channel.

The electronic device may communicate data requested to have a relatively high secure level, according to a key shared between the secure environment of the processor and the secure circuitry (e.g., the eSE).

The electronic device may encrypt data (e.g., FP information) requested to perform authentication when being accessed, through a secure key and may separately store the secure key in the secure circuitry (e.g., the eSE) to strengthen security for important information.

Modules or program modules may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added. Embodiments of the present disclosure described and shown in the drawings are provided as examples to describe technical content and help understanding but do not limit the scope of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:
1. An electronic device comprising:
a processor;
a memory configured to connect to the processor; and
an embedded secure element (eSE)secure circuitry configured to connect to the processor over a physical channel to receive secure data sent by the processor over the physical channel, and store the secure data,
wherein the secure data is requested to perform authentication,
wherein the processor is configured to be independent of a general environment and a secure environment,
wherein the secure environment is configured to one of store the secure data in the eSE over the physical channel and import stored secure data from the eSE, and
wherein when there is no key shared with the eSE, the secure environment stores the secure data in the secure environment and shares a key with the eSE through a provisioning process.

2. The electronic device of claim 1, wherein the secure data comprises at least one of biometric information, payment information, health information, and privacy information, which corresponds to the electronic device.

3. The electronic device of claim 1, wherein the processor is configured to encrypt the secure data and store the encrypted secure data or a secure key used to encrypt the secure data in the SE.

4. The electronic device of claim 3, wherein when the secure key is stored in the eSE, the processor deletes the secure key stored in the processor.

5. The electronic device of claim 1, wherein the physical channel comprises at least one of a serial port interface (SPI), a recommended standard (RS) 232 interface, and an inter-integrated circuit (I2C).

6. The electronic device of claim 1, wherein the secure environment establishes a session according to a key shared with the SE, and one of stores the secure data in the SE and imports the stored secure data through the established session.

7. The electronic device of claim 1, further comprising:
biometric sensor configured to collect biometric information of a user, wherein the processor is configured to generate the secure data using the biometric information.

8. The electronic device of claim 7, wherein the biometric sensor includes a channel that is connected to one of the general environment, the secure environment, and the SE.

9. The electronic device of claim 7, wherein the secure environment encrypts the biometric information, which is recognized through the biometric sensor, using a secure key.

10. The electronic device of claim 9, wherein the secure environment stores the encrypted biometric information in one of the general environment and the secure environment.

11. The electronic device of claim 9, wherein the secure environment stores the secure key in one of the secure environment and the SE.

12. The electronic device of claim 11, wherein when the secure key is stored in the eSE, the secure environment deletes the secure key stored in the secure environment.

13. The electronic device of claim 7, wherein the general environment sends a request to authenticate the biometric information to the secure environment and sends first biometric information, which is recognized through the biometric sensor, to the secure environment.

14. The electronic device of claim 13, wherein when receiving the request to authentication the biometric information, the secure environment establishes a session according to a key shared with the eSE, requests the eSE to send the secure key, which is stored in the eSE, through the session, and decrypts previously stored encrypted second biometric information.

15. The electronic device of claim 1, wherein when a provisioning event occurs, the secure environment sends a first certificate to the eSE such that the eSE verifies the validity of the secure environment, and
wherein the secure environment requests the eSE to send a second certificate and verifies the validity of the eSE according to the second certificate.

16. The electronic device of claim 15, wherein the secure environment sends the first certificate and a channel certificate to the SE, and
wherein the SE is configured to verify the first certificate and the channel certificate according to a previously stored certificate relating to the electronic device.

17. The electronic device of claim 15, wherein the secure environment sends a request to send a second certificate to the eSE, and
wherein when receiving the second certificate from the eSE in response to the request, the secure environment is configured to verify the second certificate according to a previously stored certificate relating to eSE.

18. A data storing method performed in an electronic device, the method comprising:
obtaining secure data, which is requested to perform authentication; and
storing at least part of the secure data in an embedded secure element (eSE) of the electronic device that is connected to a processor over a physical channel,
wherein the processor is configured to be independent of a general environment and a secure environment,
wherein the secure environment is configured to one of store the secure data in the eSE over the physical channel and import stored secure data from the eSE, and
wherein when there is no key shared with the eSE, the secure environment stores the secure data in the secure environment and shares a key with the eSE through a provisioning process.

* * * * *